United States Patent
Dabas et al.

(10) Patent No.: US 12,243,530 B2
(45) Date of Patent: *Mar. 4, 2025

(54) MULTIPLE SKILLS PROCESSING

(71) Applicant: Amazon Technologies, Inc., Seattle, WA (US)

(72) Inventors: Rohin Dabas, Kirkland, WA (US); Troy Dean Schuring, Maple Valley, WA (US); Rashmi Tonge, Bellevue, WA (US); Michael James Montgomery, Seattle, WA (US); Kevindra Pal Singh, Seattle, WA (US); Adam Baran, Redmond, WA (US); David Thomas, Woodinville, WA (US); Nnenna Eleanya Okwara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,516

(22) Filed: Jan. 12, 2024

(65) Prior Publication Data
US 2024/0185852 A1    Jun. 6, 2024

Related U.S. Application Data

(63) Continuation of application No. 17/945,320, filed on Sep. 15, 2022, now Pat. No. 11,887,596, which is a continuation of application No. 16/294,747, filed on Mar. 6, 2019, now Pat. No. 11,455,987.

(51) Int. Cl.
  *G10L 15/22*   (2006.01)
  *G10L 15/18*   (2013.01)
  *G10L 15/30*   (2013.01)
  *G10L 15/183*  (2013.01)

(52) U.S. Cl.
  CPC .......... *G10L 15/22* (2013.01); *G10L 15/1815* (2013.01); *G10L 15/30* (2013.01); *G10L 15/1822* (2013.01); *G10L 15/183* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 8,620,667 B2* | 12/2013 | Andrew | G10L 15/19 704/270.1 |
| 10,091,545 B1* | 10/2018 | Cwik | H04N 21/6547 |
| 10,332,513 B1* | 6/2019 | D'Souza | G10L 15/22 |
| 11,037,562 B2* | 6/2021 | Shah | G06F 3/167 |
| 11,508,376 B2* | 11/2022 | Nitz | G10L 15/30 |

(Continued)

*Primary Examiner* — Richard Z Zhu
(74) *Attorney, Agent, or Firm* — Pierce Atwood LLP

(57) ABSTRACT

Described herein is a system for enabling a user to perform complex goals using multiple skills/applications of an intelligent assistant device. Skills may register as consumers of an action or providers of an action, and the consumer skills may be configured to invoke provider skills to perform actions. The system receives a request to perform an action from a skill along with some action data. The system validates the action data, selects another skill to perform the action, and forwards the request to the selected skill to perform the action.

20 Claims, 17 Drawing Sheets

(56) References Cited

U.S. PATENT DOCUMENTS

| | | | |
|---|---|---|---|
| 11,631,017 B2* | 4/2023 | White | G06N 5/043 |
| | | | 706/49 |
| 2014/0172953 A1* | 6/2014 | Blanksteen | H04L 51/18 |
| | | | 709/203 |
| 2017/0025124 A1* | 1/2017 | Mixter | G10L 15/22 |
| 2019/0130915 A1* | 5/2019 | Nitz | G10L 15/32 |
| 2019/0243669 A1* | 8/2019 | Gupta | G10L 15/26 |
| 2020/0175118 A1* | 6/2020 | Mahajan | G10L 17/22 |
| 2020/0304493 A1* | 9/2020 | Lewis | G06F 21/34 |
| 2020/0382517 A1* | 12/2020 | Alsina | H04L 63/102 |

\* cited by examiner

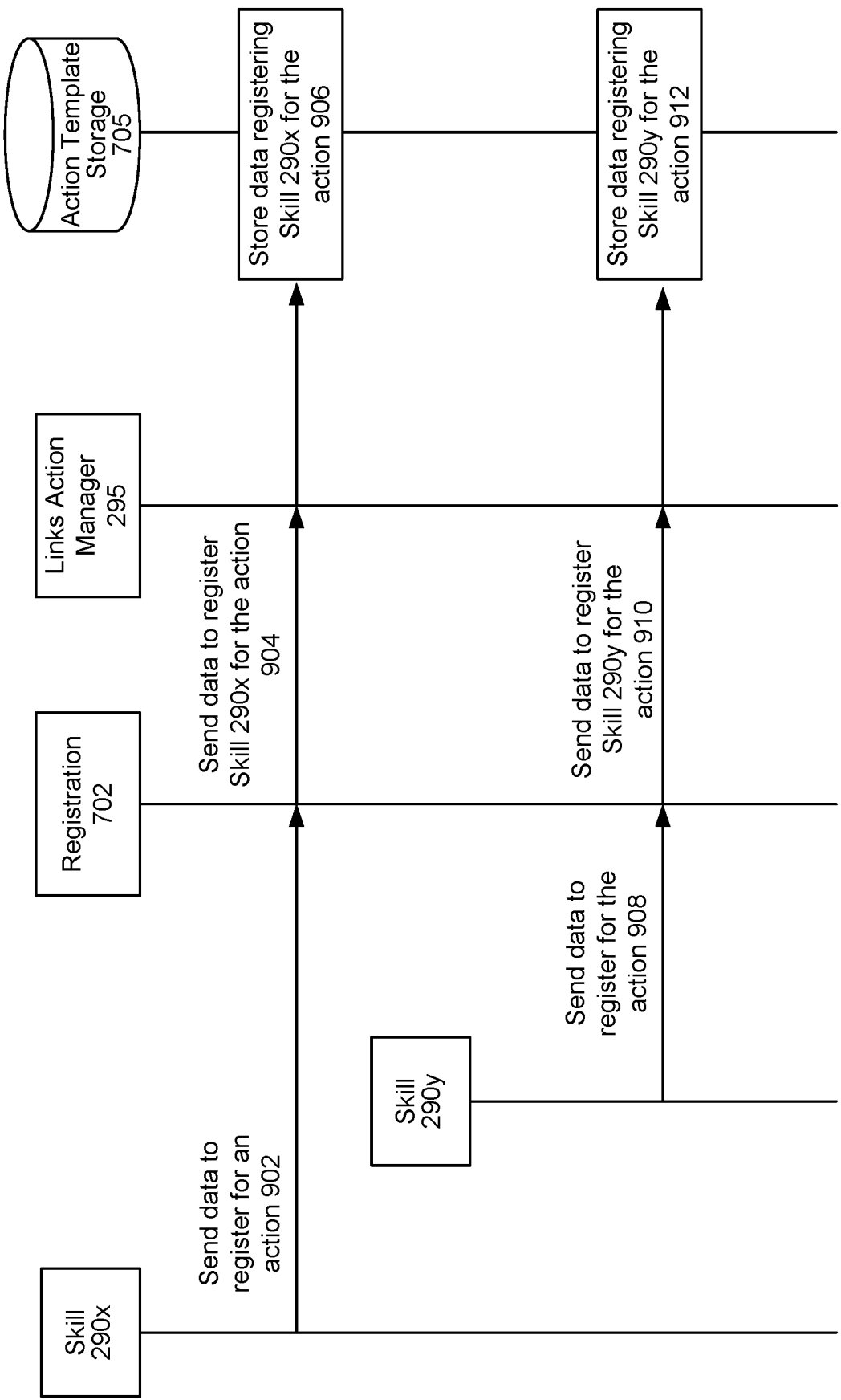

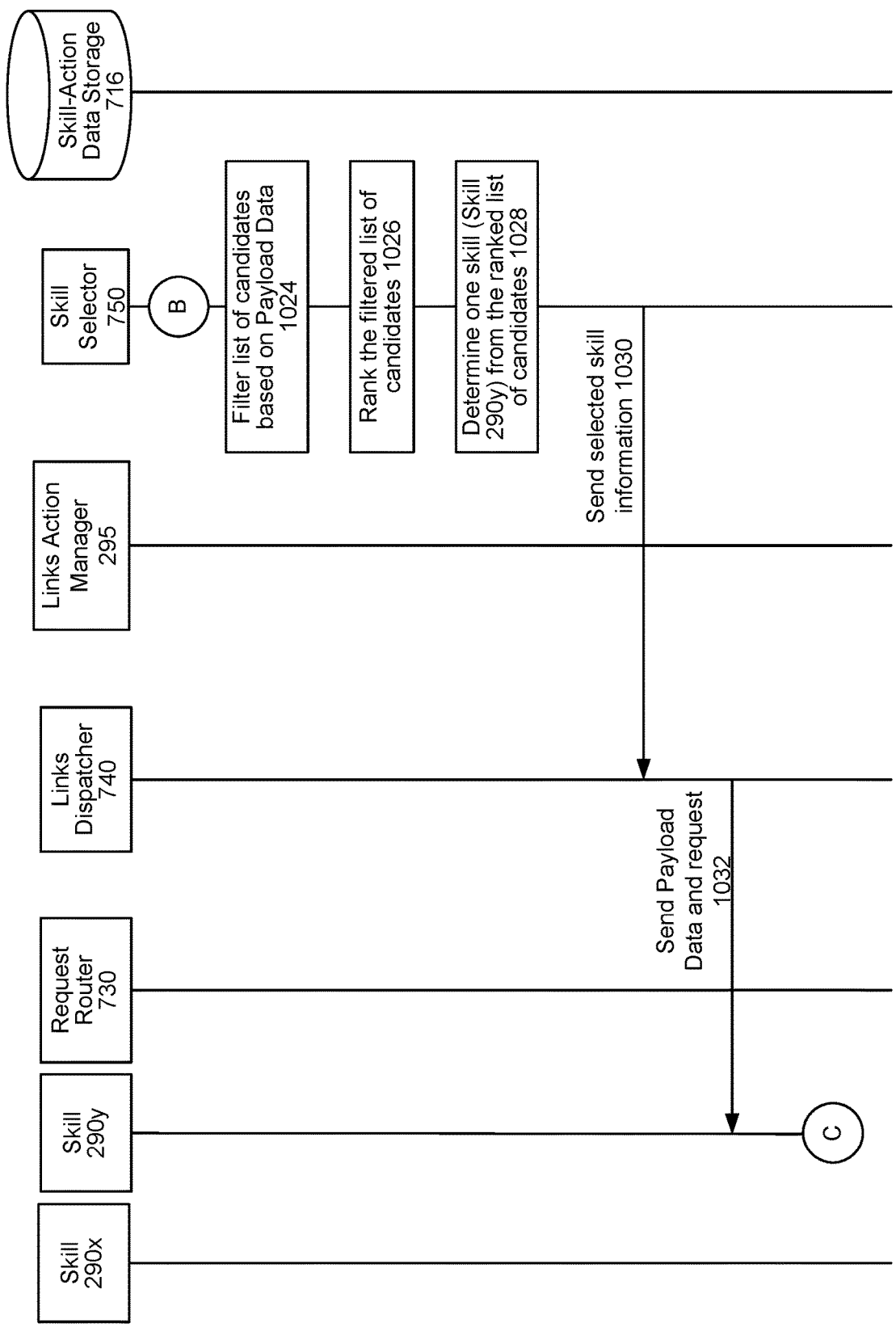

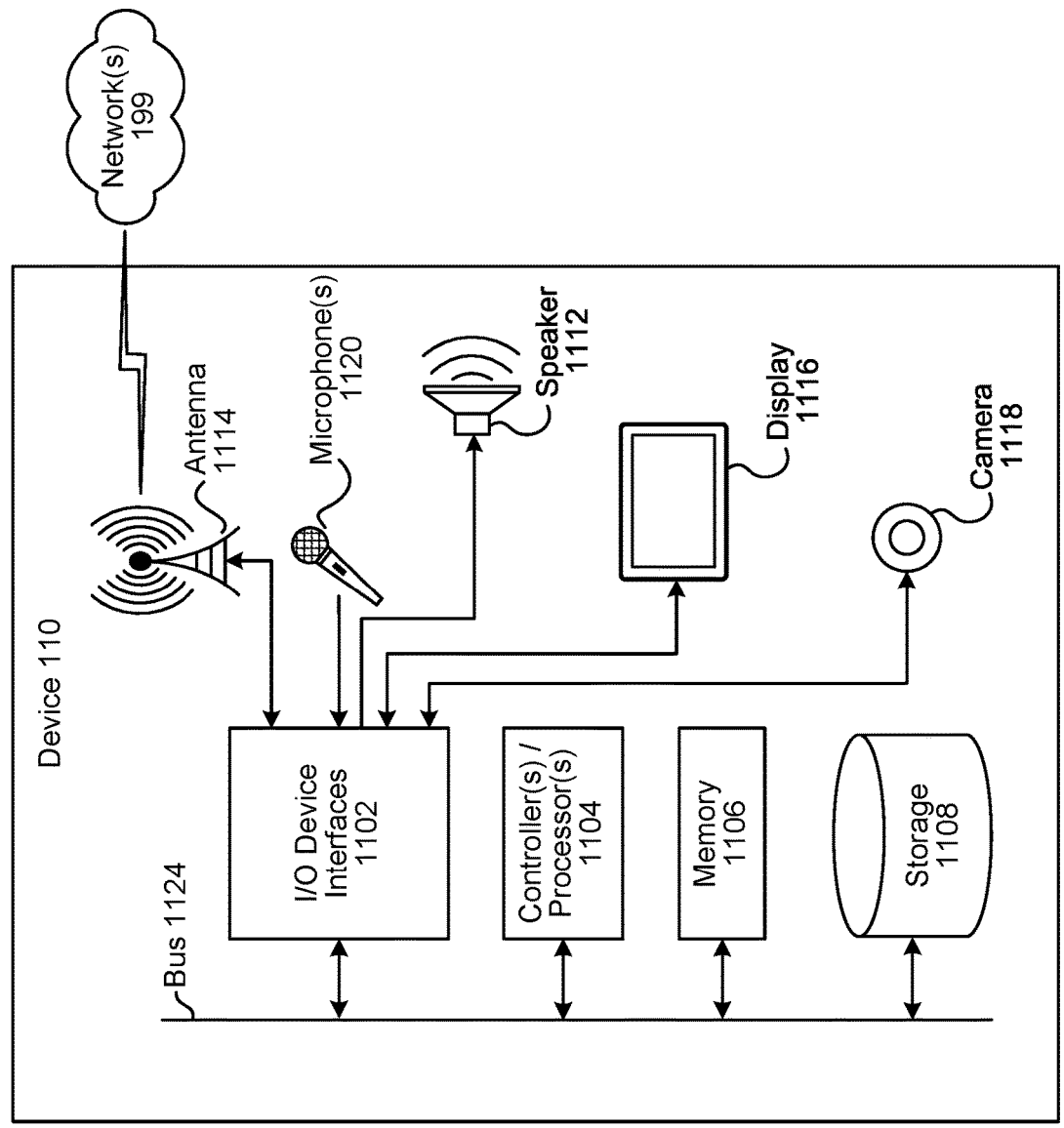

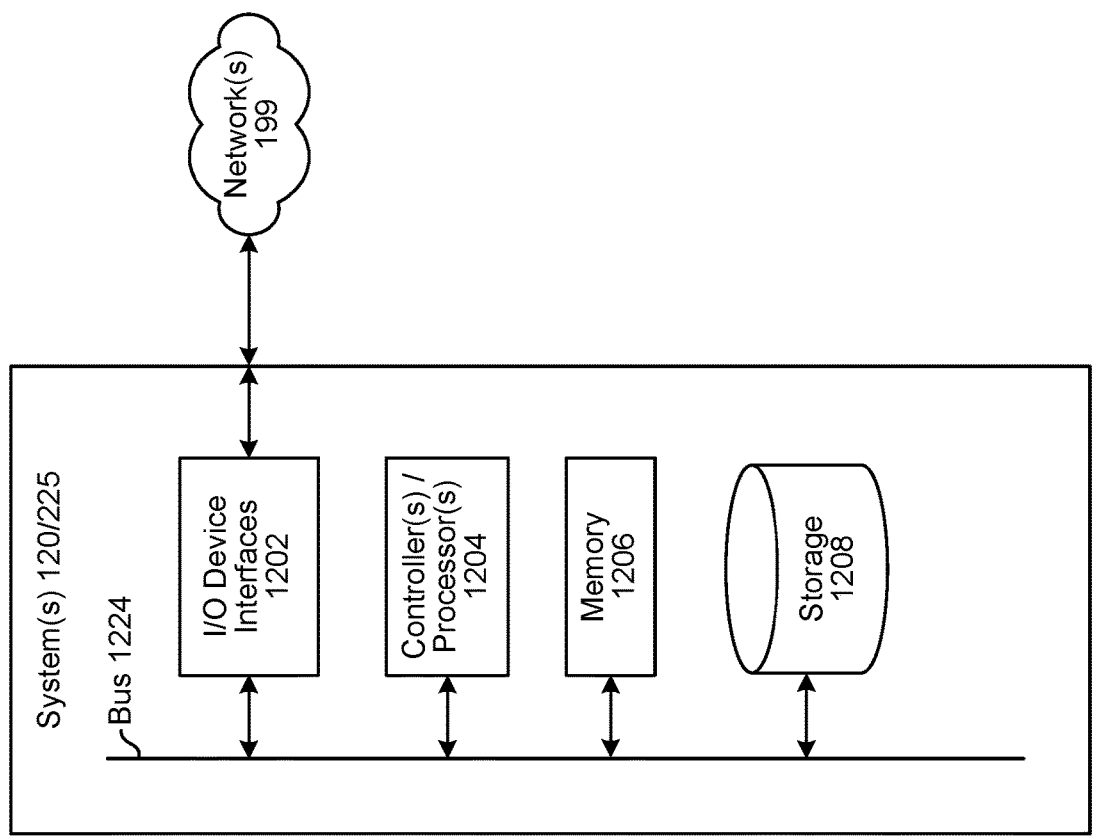

MULTIPLE SKILLS PROCESSING

CROSS-REFERENCE TO RELATED APPLICATION

This application is a continuation of, and claims priority to, U.S. Non-Provisional patent application Ser. No. 17/945,320, filed Sep. 15, 2022, and entitled "MULTIPLE SKILLS PROCESSING", scheduled to issue as U.S. Pat. No. 11,887,596, which is a continuation of U.S. Non-Provisional patent application Ser. No. 16/294,747, filed Mar. 6, 2019, and entitled "MULTIPLE SKILLS PROCESSING," now issued U.S. Pat. No. 11,455,987, both of which are herein incorporated by reference in their entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input speech represented in audio data, is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 is a schematic diagram of an illustrative architecture in which sensor data is combined to recognize one or more users according to embodiments of the present disclosure.

FIG. 9 is a signal flow diagram illustrating how a skill may register to be able to invoke an action according to embodiments of the present disclosure.

FIGS. 10A-10D are signal flow diagrams illustrating how a request requiring execution of multiple skills is processed according to embodiments of the present disclosure.

FIG. 11 is a block diagram conceptually illustrating example components of a device according to embodiments of the present disclosure.

FIG. 12 is a block diagram conceptually illustrating example components of a server according to embodiments of the present disclosure.

DETAILED DESCRIPTION

Figure 1:
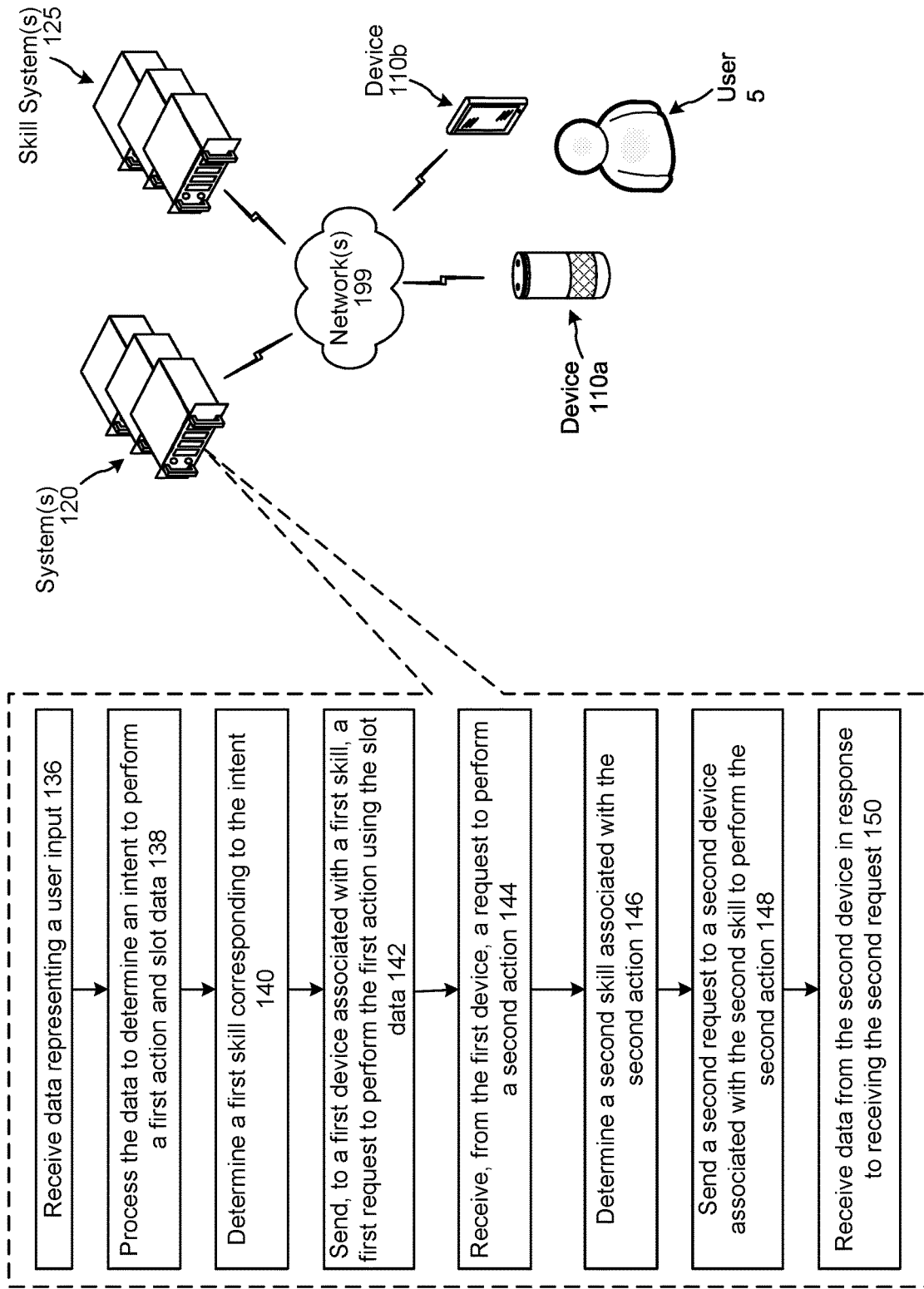
FIG. 1 illustrates a system processing an utterance where an invoked skill is permitted and configured to invoke a different skill according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John." In still a further example, for the user input of "Alexa, make a dinner reservation," a system may invoke an application/skill configured to interface with dining data to obtain reservation information from a user and make a reservation at a restaurant.

The system may include multiple applications/skills that are capable of performing particular actions. The system may identify an appropriate skills system to perform a particular action. For example, the skill system corresponding to Amazon Music and the skill system corresponding to Pandora are both capable of playing music. The system may choose one of these skill systems to play music based on various factors.

In some instances, a user may have to provide separate specific inputs to activate or initiate multiple skills for different tasks. For example, to make a reservation at a restaurant a user may have to input a request such as "Alexa, make a reservation at XYZ restaurant for 2 for tomorrow night at 7 PM." In response, the system executes the appropriate skill to make the reservation. Then to reserve a taxi/car, the user may have to input a request such as "Alexa, reserve a car ride for 2 for tomorrow night at 6:30 PM from home to XYZ restaurant." In response, the system executes the appropriate skill to reserve the taxi/car.

In accordance with some embodiments, the systems and methods described herein allow (assuming user permission) a skill to invoke another skill to perform an action by the other skill, even if the other action for the other skill was not necessarily requested by the user. Thus the system enables the system to perform multiple actions and the user to initiate multiple skills with fewer user inputs. For example, using the system described herein, a user may input "Alexa, make a reservation at ABC restaurant for 2 for Friday at 8 PM." In response, the system may execute the appropriate reservation skill and make the reservation. The reservation skill may be configured to invoke a ride service skill, resulting in a query to the user about invocation of the ride service skill. Thus, after confirmation of the restaurant reservation the system may then ask the user if he or she would like to reserve a car ride to ABC restaurant. If the user responds "yes," the system may execute the appropriate skill to reserve a car ride to ABC restaurant for 2 for Friday from the user's home to ABC restaurant for an appropriate time so that the user will reach ABC restaurant by 8 PM. In this manner, the user may complete multiple tasks/actions using fewer inputs.

The system described herein enables linking skills to actions executable by other skills and enables a skill to forward data to another skill to perform additional actions. In example embodiments, the system provides components to enable skills to register to perform particular actions that may actually be executed by other skills, thus allowing one skill to be indicated as a provider of or a consumer of, an action of another skill. Referring to the example above, the skill corresponding to performing restaurant reservations may register as a consumer of an action that enables the user to reserve/order a car ride. The skill corresponding to performing car ride reservations may register as a provider of the action that enables the user to reserve/order a car ride. The skill registering as a provider of an action may also indicate parameters or data required by the skill to perform the action. For example, a skill corresponding to reserving a car ride may require the following parameters or data: number of people, pickup address, destination address, time of pickup, or time of arrival. Any skill then desiring to "offer" a ride action (e.g., a reservation skill, movie ticket purchase skill, etc.) may then register with the system as a provider of that type of action and an utterance invoking such a registered skill may enter into a dialog where the invoked skill prompts the system to ask the user if the user desires a ride, and if so, execute a dialog exchange to obtain the data needed to fill the ride parameters and ultimately book the ride as well.

Multiple skills may be registered as a provider for a particular action. In example embodiments, the system described herein selects a skill from the ones that are registered, based on various factors, to perform the action.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system configured to invoke multiple skills to perform multiple actions according to embodiments of the present disclosure. As illustrated in FIG. 1, the system may include one or more devices (110a/110b) local to a user 5, one or more systems 120, and one or more skill systems 125 connected across one or more networks 199.

The system(s) 120 may receive (136) data representing a user input. The data may be audio data representing an utterance spoken by the user 5 and captured by the device 110a. Alternatively, the data may be text data inputted by the user 5 via the device 110b. The system(s) 120 may associate the data with a dialog identifier to keep track of an exchange of inputs and outputs between the user 5 and the device 110.

The system(s) 120 may process (138) the data to determine an intent to perform a first action and slot data associated with execution of the first action. The system(s) 120 may determine (140) a first skill corresponding to the intent to perform the first action. The system(s) 120 may send (142) a first request to a first device (e.g., a skill system 125) associated with the first skill to perform the first action using the slot data. The system(s) 120 may also send the dialog identifier to the first device. The system(s) 120 may receive (144) a request from the first device to perform a second action. The first device may determine the second action to be performed based on the intent or based on the first skill being registered/authorized to invoke the second action. The first device may also send data (slot data, intent and/or input data) to the system(s) 120 along with the request to perform the second action.

The system(s) 120 may determine (146) a second skill associated with the second action. The system(s) 120 may query a data source to determine the second skill. The data source may store data indicating that the second skill is registered or authorized to perform the second action. The system(s) 120 may send (148) a second request to a second device (e.g., a skill system 125) associated with the second skill to perform the second action. The system(s) 120 may also send slot data, intent or input data along with the second request to enable the second skill to perform the second action. The system(s) 120 may also send the dialog identifier to the second device.

The system(s) 120 may receive (150) data from the second device in response to receiving the second request. The second device may send acknowledgment data indicating acknowledgment of the second request to perform the second action. The second device may alternatively or additionally send data indicating successful completion of the second action by the second skill. The second device may send data indicating some output of completing the second action by the second skill. The system(s) 120 may send the data received from the second device to the first device/first skill.

In some embodiments, the first skill and the second skill may be executed by the first device. As used herein, a skill may include one or more components capable of performing certain actions as indicated by an intent. The skill may be configured to output natural language data that includes words understandable in a natural language (such as English, Spanish, French, etc.) The skill may be configured to perform an action and output natural language data related to performance of the action. For example, a skill may be able to make a reservation for a car ride and output "your car has been ordered" via a user device to indicate to the user that an action has been performed.

As used herein, a "request to perform an action" may include data indicating the requesting skill (e.g., the first skill), data indicating the action to the be performed (e.g., the second action), data relating to performing the action (e.g., payload data, slot data, intent data, etc.), data relating to an output/results expected by the requesting skill, and the like.

The request to perform an action may be an application program interface (API) call. Some examples of API calls that may be used with the system(s) 120 include "OrderCar," "MakeRestaurantReservation," "PrintDocument," "PlayMusic," and the like.

Although the operations of FIG. 1 are described as determining a first skill and a second skill to perform an action, it should be understood that the system(s) 120 may determine a first application and a second application to perform an action. In this sense, the present disclosure may be used to execute a routine(s) including multiple actions, where an application or component executing a first action may invoke a second application/component to execute a second action.

Figure 2A:
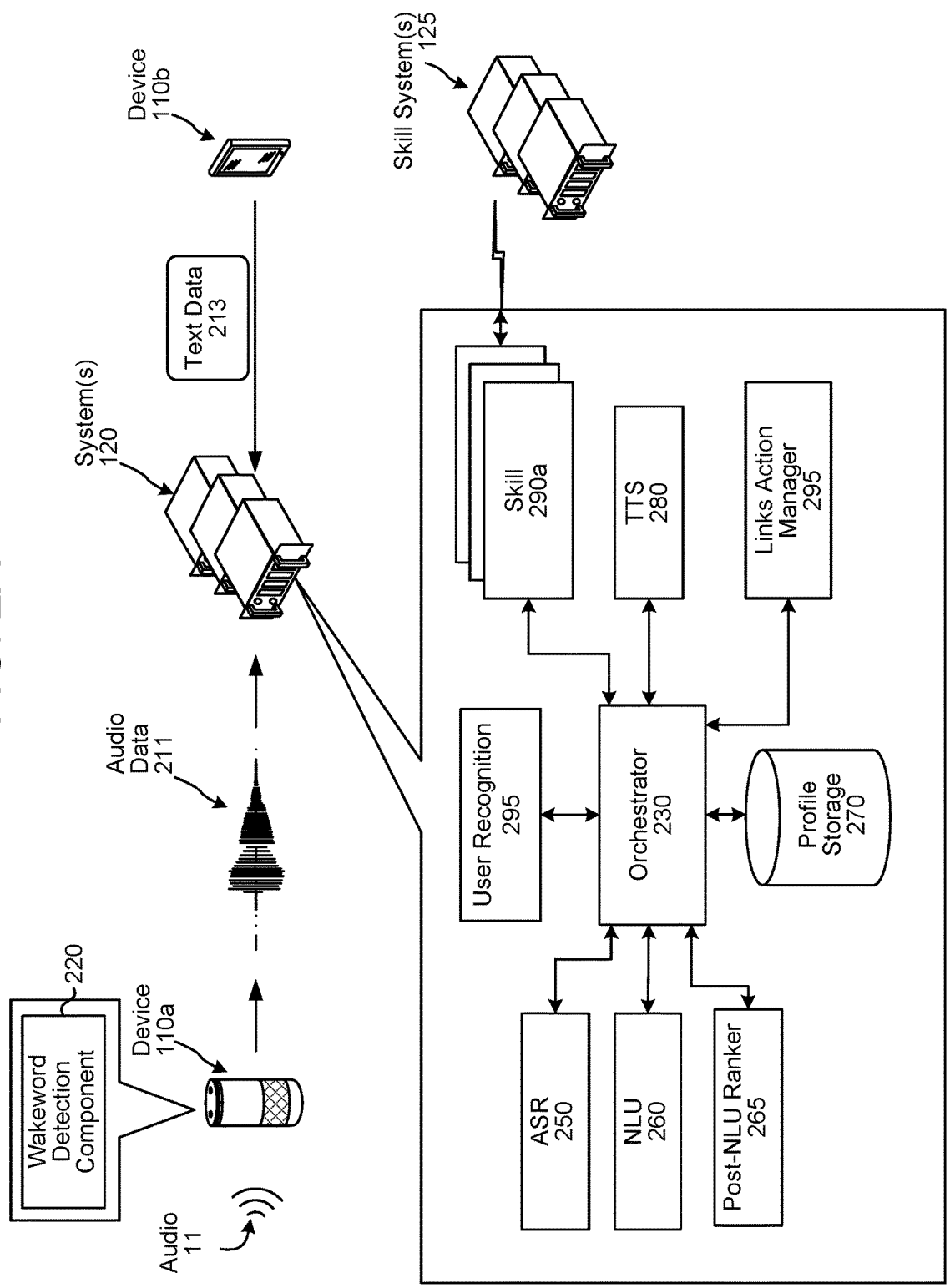
FIG. 2A is a conceptual diagram of components of a system according to embodiments of the present disclosure.

The overall system of the present disclosure may operate using various components as illustrated in FIG. 2A. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the system(s) 120. The audio data 211 may include data corresponding to the wakeword, or the device 110*a* may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 213 representing the text-based user input. The device 110*a* may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 225.

Unless expressly stated otherwise, reference to a skill, skill device, skill component, or the like herein may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 7:
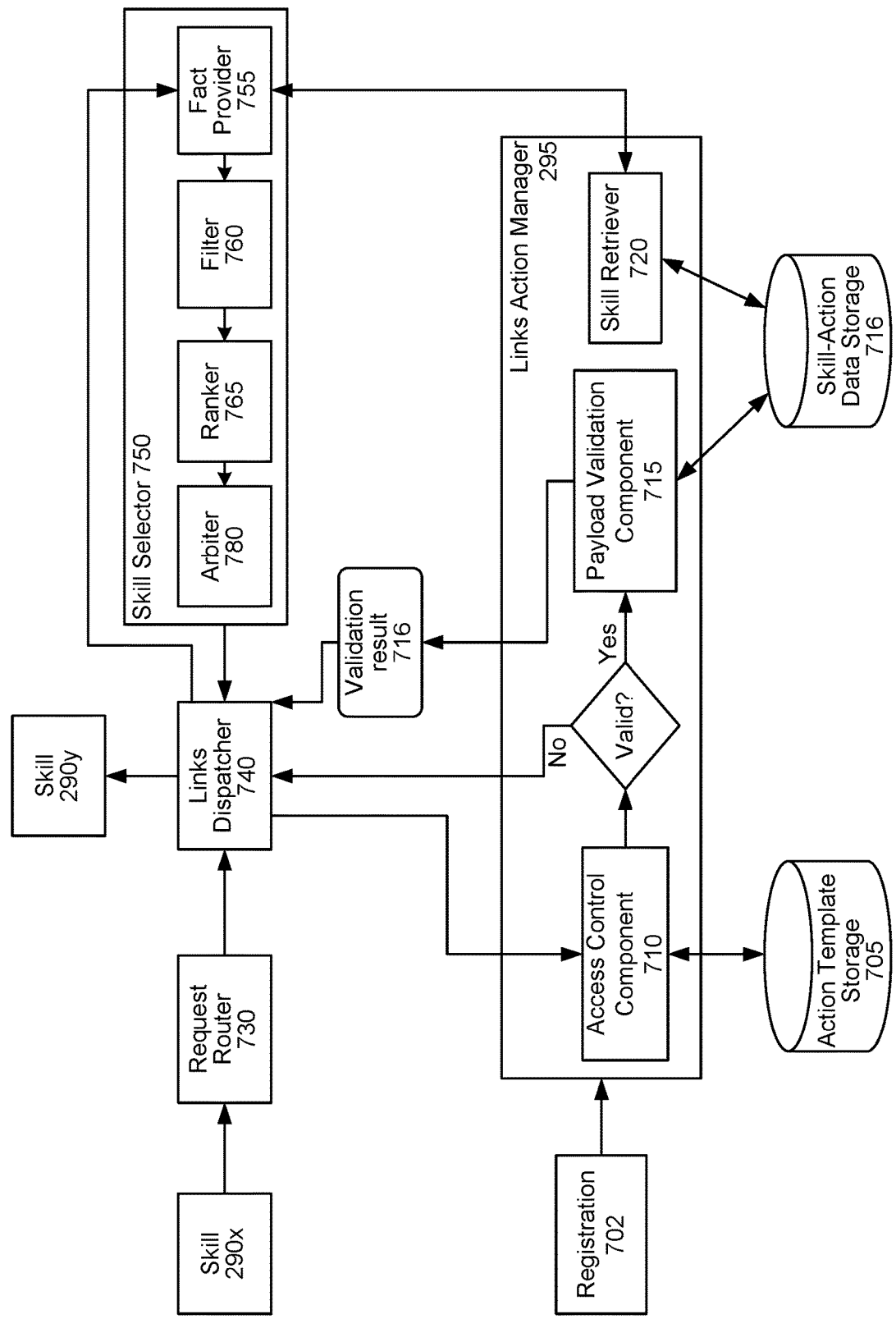
FIG. 7 is a conceptual diagram illustrating how a system may process allowing a certain skill to invoke another skill according to embodiments of the present disclosure.

The system(s) 120 may include a links action manager component 295, operations of which are described further in connection with FIG. 7. The links action manager component 295 may facilitate determining which skills are registered to perform an action, validate payload data received from a skill to determine whether the action can be performed by another skill, and facilitate other functionalities described herein. One or more components of the links action manager 295 may be included within the orchestrator component 230.

Figure 2B:
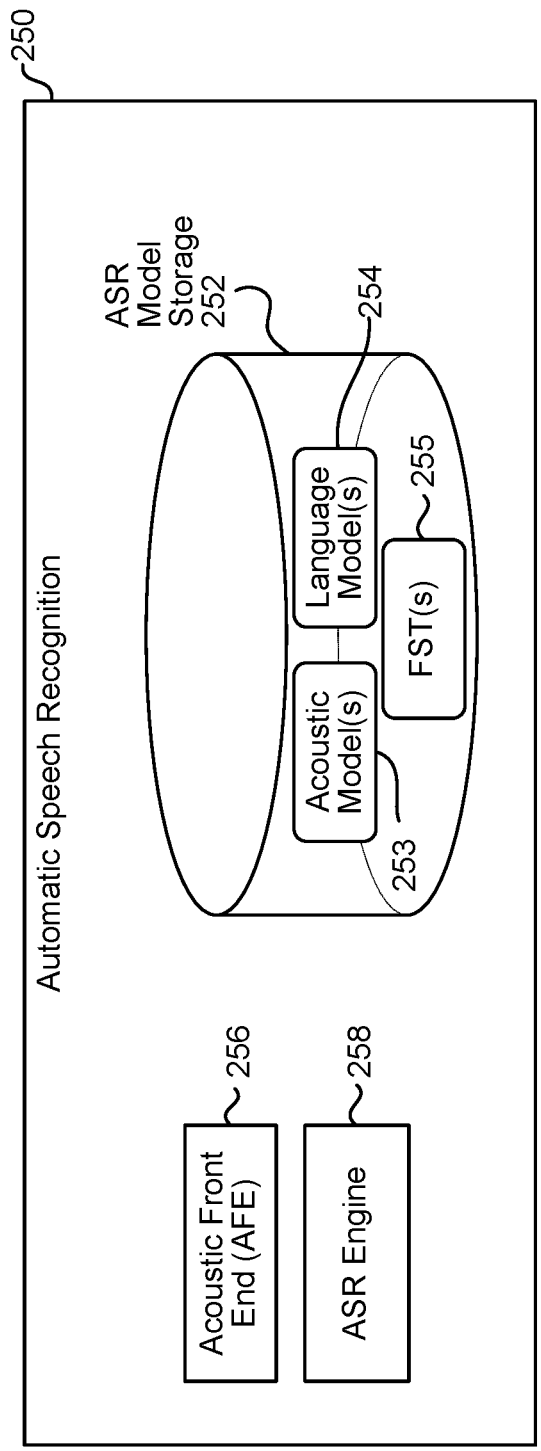
FIG. 2B is a conceptual diagram of automatic speech recognition (ASR) components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

The system(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
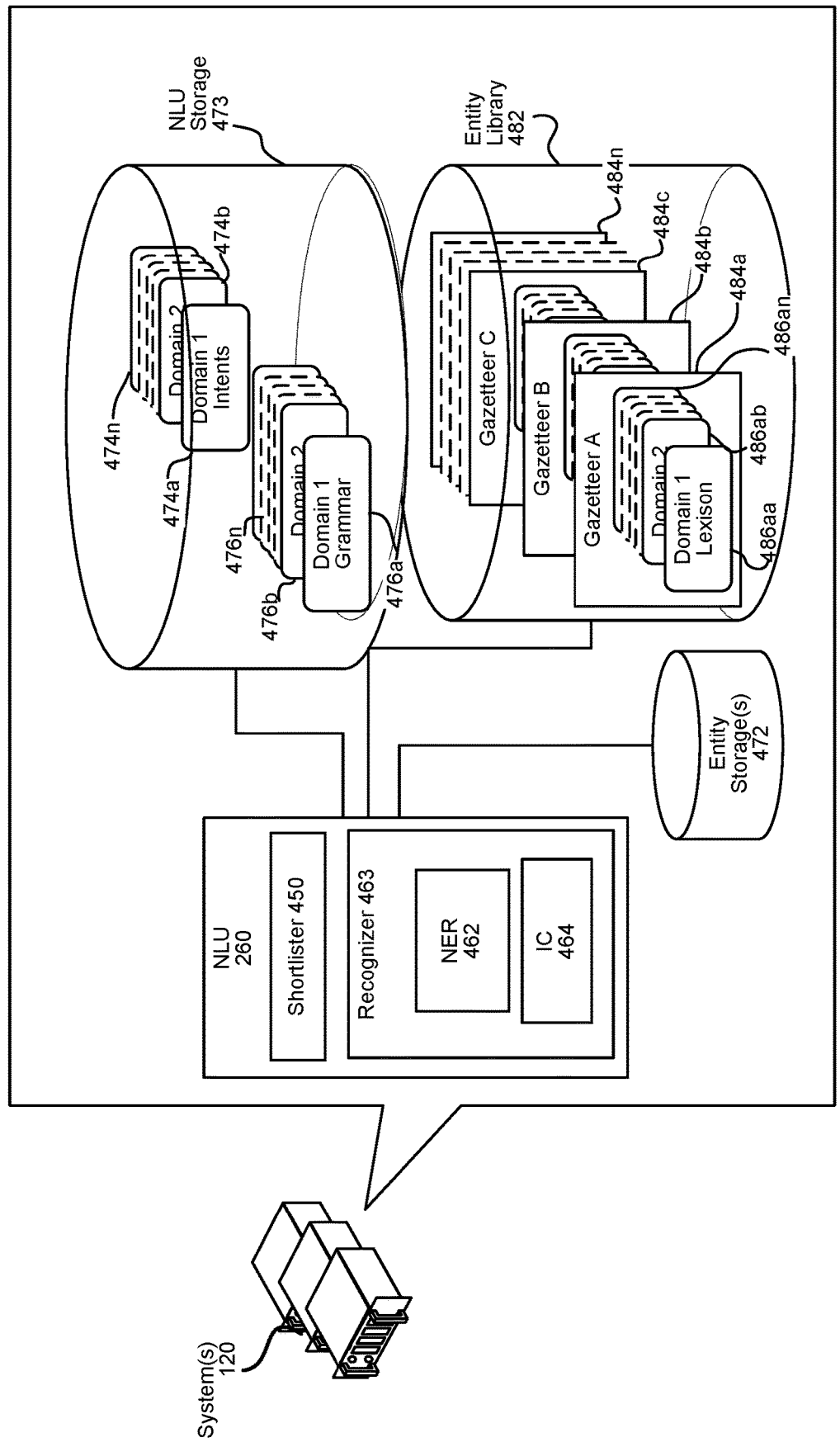
FIG. 4 is a conceptual diagram illustrating how NLU processing may be performed according to embodiments of the present disclosure.

FIG. 4 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 450. The shortlister component 450 selects skills that may execute with respect to text data 510 input to the NLU component 260 (e.g., applications that may execute with respect to the user input). The shortlister component 450 thus limits downstream, more resource intensive NLU processes to being performed with respect to skills that may execute with respect to the user input.

Without a shortlister component 450, the NLU component 260 may process text data 510 input thereto with respect to every skill of the system, either in parallel, in series, or using some combination thereof. By implementing a shortlister component 450, the NLU component 260 may process text data 510 with respect to only the skills that may execute with respect to the user input. This reduces total compute power and latency attributed to NLU processing.

The shortlister component 450 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 450 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 450 may be trained with respect to a different skill. Alternatively, the shortlister component 450 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 450. For example, some sample user inputs may be positive examples (e.g., user inputs that may be used to invoke the skill). Other sample user inputs may be negative examples (e.g., user inputs that may not be used to invoke the skill).

As described above, the shortlister component 450 may include a different trained model for each skill of the system, a different trained model for each domain, or some other combination of trained model(s). For example, the shortlister component 450 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 450 to output indications of only a portion of the skills that the text data 510 may relate to. For example, a user input may correspond to "tell me about Tom Collins." If the model is clustered based on domain, the shortlister component 450 may determine the user input corresponds to a recipe skill (e.g., a drink recipe) even though the user input may also correspond to an information skill (e.g., including information about a person named Tom Collins).

Training the shortlister component 450 may require establishing a "ground truth" for the training examples input therein. The shortlister component 450 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 463. Each recognizer 463 may be associated with a different domain (e.g., smart home, video, music, weather, custom, etc.).

If the shortlister component 450 determines text data 510 is potentially associated with multiple domains, the recognizers 463 associated with the domains may process the text data 510, while recognizers 463 not indicated in the shortlister component 450's output may not process the text data 510. The "shortlisted" recognizers 463 may process the text data 510 in parallel, in series, partially in parallel, etc. For example, if text data 510 potentially relates to both a communications domain and a music domain, a recognizer associated with the communications domain may process the text data 510 in parallel, or partially in parallel, with a recognizer associated with the music domain processing the text data 510.

Each recognizer 463 may include a named entity recognition (NER) component 462. The NER component 462 attempts to identify grammars and lexical information that may be used to construe meaning with respect to text data input therein. The NER component 462 identifies portions of text data that correspond to a named entity associated with a domain, associated with the recognizer 463 implementing the NER component 462. The NER component 462 (or other component of the NLU component 260) may also determine whether a word refers to an entity whose identity is not explicitly mentioned in the text data, for example "him," "her," "it" or other anaphora, exophora, or the like.

Each recognizer 463, and more specifically each NER component 462, may be associated with a particular grammar database 476, a particular set of intents/actions 474, and a particular personalized lexicon 486. Each gazetteer 484 may include domain-indexed lexical information associated with a particular user and/or device 110. For example, a Gazetteer A (484a) includes domain-indexed lexical information 486aa to 486an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 462 applies grammar information 476 and lexical information 486 associated with a domain (associated with the recognizer 463 implementing the NER component 462) to determine a mention of one or more entities in text data. In this manner, the NER component 462 identifies "slots" (each corresponding to one or more particular words in text data) that may be useful for later processing. The NER component 462 may also label each slot with a type (e.g., noun, place, city, artist name, song name, etc.).

Each grammar database 476 includes the names of entities (i.e., nouns) commonly found in speech about the particular domain to which the grammar database 476 relates, whereas the lexical information 486 is personalized to the user and/or the device 110 from which the user input originated. For example, a grammar database 476 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (484a-484n) stored in an entity library storage 482. The gazetteer information 484 may be used to match text data (representing a portion of the user input) with text data representing known entities, such as song titles, contact names, etc. Gazetteers 484 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 463 may also include an intent classification (IC) component 464. An IC component 464 parses text data to determine an intent(s) (associated with the domain associated with the recognizer 463 implementing the IC component 464) that potentially represents the user input. An intent represents to an action a user desires be performed. An IC component 464 may communicate with a database 474 of words linked to intents. For example, a music intent database may link words and phrases such as "quiet," "volume off," and "mute" to a <Mute> intent. An IC component 464 identifies potential intents by comparing words and phrases in text data (representing at least a portion of the user input) to the words and phrases in an intents database 474 (associated with the domain that is associated with the recognizer 463 implementing the IC component 464).

The intents identifiable by a specific IC component 464 are linked to domain-specific (i.e., the domain associated with the recognizer 463 implementing the IC component 464) grammar frameworks 476 with "slots" to be filled. Each slot of a grammar framework 476 corresponds to a portion of text data that the system believes corresponds to an entity. For example, a grammar framework 476 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 476 may not be structured as sentences, but rather based on associating slots with grammatical tags.

For example, an NER component 462 may parse text data to identify words as subject, object, verb, preposition, etc. based on grammar rules and/or models prior to recognizing named entities in the text data. An IC component 464 (implemented by the same recognizer 463 as the NER component 462) may use the identified verb to identify an intent. The NER component 462 may then determine a grammar model 276 associated with the identified intent. For example, a grammar model 476 for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon 486 (associated with the domain associated with the recognizer 463 implementing the NER component 462), attempting to match words and phrases in text data the NER component 462 previously tagged as a grammatical object or object modifier with those identified in the lexicon 486.

An NER component 462 may perform semantic tagging, which is the labeling of a word or combination of words according to their type/semantic meaning. An NER component 462 may parse text data using heuristic grammar rules, or a model may be constructed using techniques such as Hidden Markov Models, maximum entropy models, log linear models, conditional random fields (CRF), and the like. For example, an NER component 462 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 identifies "Play" as a verb based on a word database associated with the music domain, which an IC component 464 (also implemented by the music domain recognizer) may determine corresponds to a <PlayMusic> intent. At this stage, no determination has been made as to the meaning of "mother's little helper" or "the rolling stones," but based on grammar rules and models, the NER component 462 has determined the text of these phrases relates to the grammatical object (i.e., entity) of the user input represented in the text data.

An NER component 462 may tag text data to attribute meaning thereto. For example, an NER component 462 may tag "play mother's little helper by the rolling stones" as: {domain} Music, {intent}<PlayMusic>, {artist name} rolling stones, {media type} SONG, and {song title} mother's little helper. For further example, the NER component 462 may tag "play songs by the rolling stones" as: {domain} Music, {intent} <PlayMusic>, {artist name} rolling stones, and {media type} SONG.

Figure 5:
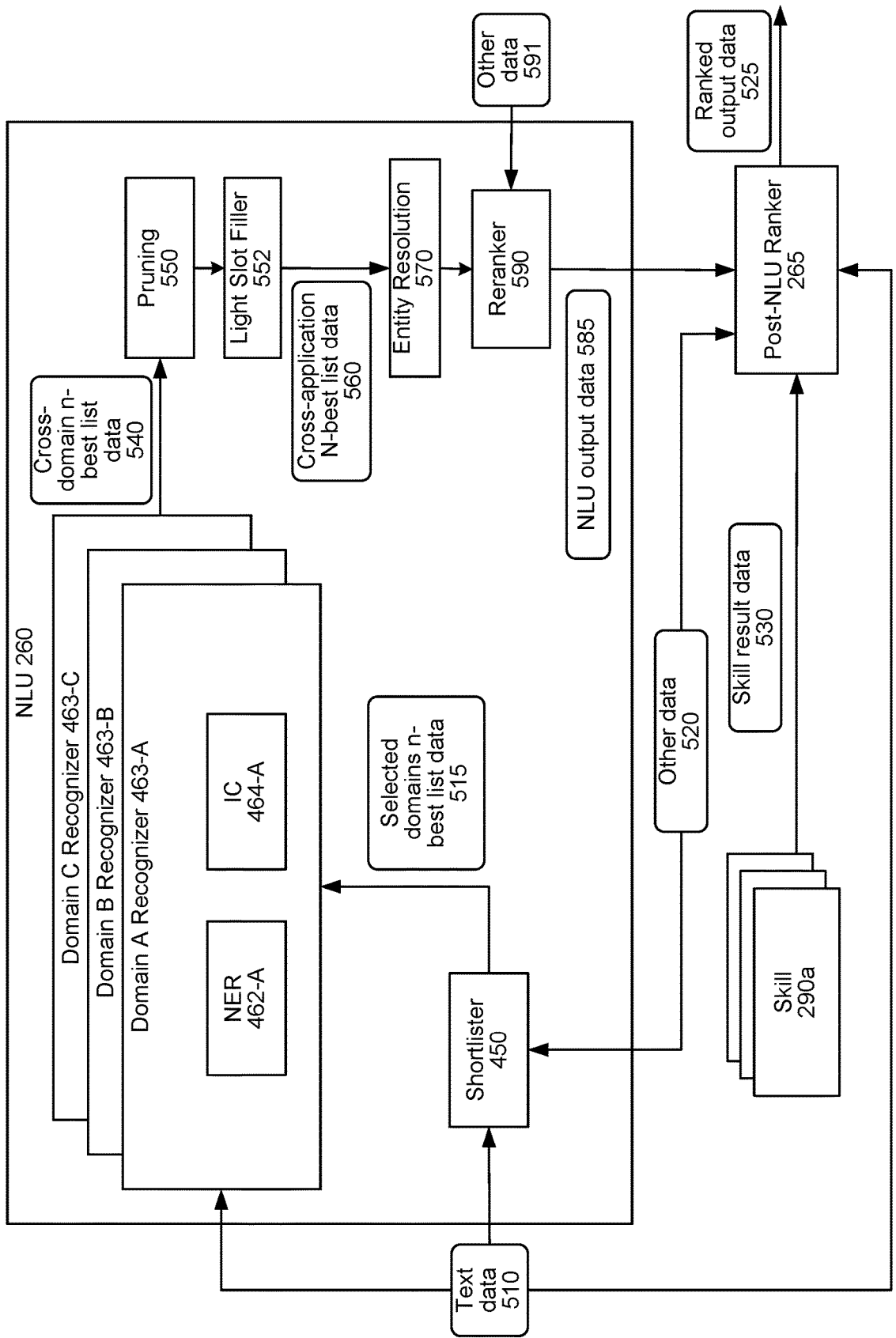
FIG. 5 is a conceptual diagram illustrating how NLU processing may be performed according to embodiments of the present disclosure.

The shortlister component 450 may receive text data 510 output from the ASR component 250 or output from the device 110b (as illustrated in FIG. 5). The ASR component 250 may embed the text data 510 into a form processable by a trained model(s) using sentence embedding techniques as known in the art. Sentence embedding results in the text data 510 including text in a structure that enables the trained models of the shortlister component 550 to operate on the text data 510. For example, an embedding of the text data 510 may be a vector representation of the text data 510.

The shortlister component 450 may make binary determinations (e.g., yes or no) regarding which domains relate to the text data 510. The shortlister component 450 may make such determinations using the one or more trained models described herein above. If the shortlister component 450 implements a single trained model for each domain, the shortlister component 450 may simply run the models that are associated with enabled domains as indicated in a user profile associated with the device 110 and/or user that originated the user input.

The shortlister component 450 may generate n-best list data 515 representing domains that may execute with respect to the user input represented in the text data 510. The size of the n-best list represented in the n-best list data 515 is configurable. In an example, the n-best list data 515 may indicate every domain of the system as well as contain an indication, for each domain, regarding whether the domain is likely capable to execute the user input represented in the text data 510. In another example, instead of indicating every domain of the system, the n-best list data 515 may only indicate the domains that are likely to be able to execute the user input represented in the text data 510. In yet another example, the shortlister component 450 may implement thresholding such that the n-best list data 515 may indicate no more than a maximum number of domains that may execute the user input represented in the text data 510. In an example, the threshold number of domains that may be represented in the n-best list data 515 is ten. In another example, the domains included in the n-best list data 515 may be limited by a threshold a score, where only domains indicating a likelihood to handle the user input is above a certain score (as determined by processing the text data 510 by the shortlister component 450 relative to such domains) are included in the n-best list data 515.

The text data 510 may correspond to more than one ASR hypothesis. When this occurs, the shortlister component 450 may output a different n-best list (represented in the n-best list data 515) for each ASR hypothesis. Alternatively, the shortlister component 450 may output a single n-best list representing the domains that are related to the multiple ASR hypotheses represented in the text data 510.

As indicated above, the shortlister component 450 may implement thresholding such that an n-best list output therefrom may include no more than a threshold number of entries. If the text data 510 includes more than one ASR hypothesis, the n-best list output by the shortlister component 450 may include no more than a threshold number of entries irrespective of the number of ASR hypotheses output by the ASR component 250. Alternatively or in addition, the n-best list output by the shortlister component 450 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 510, the shortlister component 450 may generate confidence scores representing likelihoods that domains relate to the text data 510. If the shortlister component 450 implements a different trained model for each domain, the shortlister component 450 may generate a different confidence score for each individual domain trained model that is run. If the shortlister component 450 runs the models of every domain when text data 510 is received, the shortlister component 450 may generate a different confidence score for each domain of the system. If the shortlister component 450 runs the models of only the domains that are associated with skills indicated as enabled in a user profile associated with the device 110 and/or user that originated the user input, the shortlister component 450 may only generate a different confidence score for each domain associated with at least one enabled skill. If the shortlister component 450 implements a single trained model with domain specifically trained portions, the shortlister component 450 may generate a different confidence score for each domain who's specifically trained portion is run. The shortlister component 450 may perform matrix vector modification to obtain confidence scores for all domains of the system in a single instance of processing of the text data 510.

N-best list data 515 including confidence scores that may be output by the shortlister component 450 may be represented as, for example:

Search domain, 0.67
Recipe domain, 0.62
Information domain, 0.57
Shopping domain, 0.42

As indicated, the confidence scores output by the shortlister component 450 may be numeric values. The confidence scores output by the shortlister component 450 may alternatively be binned values (e.g., high, medium, low).

The n-best list may only include entries for domains having a confidence score satisfying (e.g., equaling or exceeding) a minimum threshold confidence score. Alternatively, the shortlister component 450 may include entries for all domains associated with user enabled skills, even if one or more of the domains are associated with confidence scores that do not satisfy the minimum threshold confidence score.

The shortlister component 450 may consider other data 520 when determining which domains may relate to the user input represented in the text data 510 as well as respective confidence scores. The other data 520 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 520 may include an indicator of the user associated with the text data 510, for example as determined by the user recognition component 295.

The other data 520 may be character embedded prior to being input to the shortlister component 450. The other data 520 may alternatively be embedded using other techniques known in the art prior to being input to the shortlister component 450.

The other data 520 may also include data indicating the domains associated with skills that are enabled with respect to the device 110 and/or user that originated the user input. The shortlister component 450 may use such data to determine which domain-specific trained models to run. That is, the shortlister component 450 may determine to only run the trained models associated with domains that are associated with user-enabled skills. The shortlister component 450 may alternatively use such data to alter confidence scores of domains.

As an example, considering two domains, a first domain associated with at least one enabled skill and a second domain not associated with any user-enabled skills of the user that originated the user input, the shortlister component 450 may run a first model specific to the first domain as well as a second model specific to the second domain. Alternatively, the shortlister component 450 may run a model configured to determine a score for each of the first and second domains. The shortlister component 450 may determine a same confidence score for each of the first and second domains in the first instance. The shortlister component 450 may then alter those confidence scores based on which domains is associated with at least one skill enabled by the present user. For example, the shortlister component 450 may increase the confidence score associated with the domain associated with at least one enabled skill while leaving the confidence score associated with the other domain the same. Alternatively, the shortlister component 450 may leave the confidence score associated with the domain associated with at least one enabled skill the same while decreasing the confidence score associated with the other domain. Moreover, the shortlister component 450 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 450 receives the text data 510, the shortlister component 450 may determine whether profile data associated with the user and/or device 110 that originated the command includes an indication of enabled skills.

The other data 520 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 450 may use such data to determine which domain-specific trained models to run. For example, if the device 110 corresponds to a displayless type device, the shortlister component 450 may determine not to run trained models specific to domains that output video data. The shortlister component 450 may alternatively use such data to alter confidence scores of domains.

As an example, considering two domains, one that outputs audio data and another that outputs video data, the shortlister component 450 may run a first model specific to the domain that generates audio data as well as a second model specific to the domain that generates video data. Alternatively the shortlister component 450 may run a model configured to determine a score for each domain. The shortlister component 450 may determine a same confidence score for each of the domains in the first instance. The shortlister component 450 may then alter the original confidence scores based on the type of the device 110 that originated the user input corresponding to the text data 510. For example, if the device 110 is a displayless device, the shortlister component 450 may increase the confidence score associated with the domain that generates audio data while leaving the confidence score associated with the domain that generates video data the same. Alternatively, if the device 110 is a displayless device, the shortlister component 450 may leave the confidence score associated with the domain that generates audio data the same while decreasing the confidence score associated with the domain that generates video data. Moreover, if the device 110 is a displayless device, the shortlister component 450 may increase the confidence score associated with the domain that generates audio data as well as decrease the confidence score associated with the domain that generates video data.

The type of device information represented in the other data 520 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 520 may represent the smart TV of other display device, and not the displayless device that captured the spoken user input.

The other data 520 may also include data indicating the user input originating device's speed, location, or other mobility information. For example, the device may correspond to a vehicle including a display. If the vehicle is moving, the shortlister component 450 may decrease the confidence score associated with a domain that generates video data as it may be undesirable to output video content to a user while the user is driving. The device may output data to the system(s) 120 indicating when the device is moving.

The other data 520 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 450 may use such data to alter confidence scores of domains. For example, the shortlister component 450 may run a first model specific to a first domain as well as a second model specific to a second domain. Alternatively, the shortlister component 450 may run a model configured to determine a score for each domain. The shortlister component 450 may also determine a same confidence score for each of the domains in the first instance. The shortlister component 450 may then alter the original confidence scores based on the first domain being invoked to cause the system to output content while the current user input was received. Based on the first domain being invoked, the shortlister component 450 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 515 generated by the shortlister component 450 as well as the different types of other data 520 considered by the shortlister component 450 are configurable. For example, the shortlister component 450 may update confidence scores as more other data 520 is considered. For further example, the n-best list data 515 may exclude relevant domains if thresholding is implemented. Thus, for example, the shortlister component 450 may include an indication of a domain in the n-best list 515 unless the shortlister component 450 is one hundred percent confident that the domain may not execute the user input represented in the text data 510 (e.g., the shortlister component 450 determines a confidence score of zero for the domain).

The shortlister component 450 may send the text data 510 to recognizers 463 associated with domains represented in the n-best list data 515. Alternatively, the shortlister component 450 may send the n-best list data 515 or some other indicator of the selected subset of domains to another component (such as the orchestrator component 230) which may in turn send the text data 510 to the recognizers 463 corresponding to the domains included in the n-best list data 515 or otherwise indicated in the indicator. If the shortlister component 450 generates an n-best list representing domains without any associated confidence scores, the shortlister component 450/orchestrator component 230 may send the text data 510 to recognizers 463 associated with domains that the shortlister component 450 determines may execute the user input. If the shortlister component 450 generates an n-best list representing domains with associated confidence scores, the shortlister component 450/orchestrator component 230 may send the text data 510 to recognizers 463 associated with domains associated with confidence scores satisfying (e.g., meeting or exceeding) a threshold minimum confidence score.

A recognizer 463 may output tagged text data generated by an NER component 462 and an IC component 464, as described herein above. The NLU component 260 may compile the output tagged text data of the recognizers 463 into a single cross-domain n-best list 540 and may send the cross-domain n-best list 540 to a pruning component 550. Each entry of tagged text (e.g., each NLU hypothesis) represented in the cross-domain n-best list data 540 may be associated with a respective score indicating a likelihood that the NLU hypothesis corresponds to the domain associated with the recognizer 463 from which the NLU hypothesis was output. For example, the cross-domain n-best list data 540 may be represented as (with each line corresponding to a different NLU hypothesis):

[0.95] Intent: <PlayMusic> ArtistName: Lady Gaga SongName: Poker Face

[0.70] Intent: <Play Video> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 550 may sort the NLU hypotheses represented in the cross-domain n-best list data 540 according to their respective scores. The pruning component 550 may perform score thresholding with respect to the cross-domain NLU hypotheses. For example, the pruning component 550 may select NLU hypotheses associated with scores satisfying (e.g., meeting and/or exceeding) a threshold score. The pruning component 550 may also or alternatively perform number of NLU hypothesis thresholding. For example, the pruning component 550 may select the top scoring NLU hypothesis(es). The pruning component 550 may output a portion of the NLU hypotheses input thereto. The purpose of the pruning component 550 is to create a reduced list of NLU hypotheses so that downstream, more resource intensive, processes may only operate on the NLU hypotheses that most likely represent the user's intent.

The NLU component 260 may include a light slot filler component 552. The light slot filler component 552 can take text from slots represented in the NLU hypotheses output by the pruning component 550 and alter them to make the text more easily processed by downstream components. The light slot filler component 552 may perform low latency operations that do not involve heavy operations such as reference to a knowledge base. The purpose of the light slot filler component 552 is to replace words with other words or values that may be more easily understood by downstream components. For example, if a NLU hypothesis includes the word "tomorrow," the light slot filler component 552 may replace the word "tomorrow" with an actual date for purposes of downstream processing. Similarly, the light slot filler component 552 may replace the word "CD" with "album" or the words "compact disc." The replaced words are then included in the cross-domain n-best list data 560.

The cross-domain n-best list data 560 may be input to an entity resolution component 570. The entity resolution component 570 can apply rules or other instructions to standardize labels or tokens from previous stages into an intent/slot representation. The precise transformation may depend on the domain. For example, for a travel domain, the entity resolution component 570 may transform text corresponding to "Boston airport" to the standard BOS three-letter code referring to the airport. The entity resolution component 570 can refer to a knowledge base that is used to specifically identify the precise entity referred to in each slot of each NLU hypothesis represented in the cross-domain n-best list data 560. Specific intent/slot combinations may also be tied to a particular source, which may then be used to resolve the text. In the example "play songs by the stones," the entity resolution component 570 may reference a personal music catalog, Amazon Music account, a user profile, or the like. The entity resolution component 570 may output an altered n-best list that is based on the cross-domain n-best list 560 but that includes more detailed information (e.g., entity IDs) about the specific entities mentioned in the slots and/or more detailed slot data that can eventually be used by a skill. The NLU component 260 may include multiple entity resolution components 570 and each entity resolution component 570 may be specific to one or more domains.

The NLU component 260 may include a reranker 590. The reranker 590 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 570.

The reranker 590 may apply re-scoring, biasing, or other techniques. The reranker 590 may consider not only the data output by the entity resolution component 570, but may also consider other data 591. The other data 591 may include a variety of information. For example, the other data 591 may include skill rating or popularity data. For example, if one skill has a high rating, the reranker 590 may increase the score of a NLU hypothesis that may be processed by the skill. The other data 591 may also include information about skills that have been enabled by the user that originated the user input. For example, the reranker 590 may assign higher scores to NLU hypothesis that may be processed by enabled skills than NLU hypothesis that may be processed by non-enabled skills. The other data 591 may also include data indicating user usage history, such as if the user that originated the user input regularly uses a particular skill or does so at particular times of day. The other data 591 may additionally include data indicating date, time, location, weather, type of device 110, user identifier, context, as well as other information. For example, the reranker 590 may consider when any particular skill is currently active (e.g., music being played, a game being played, etc.).

As illustrated and described, the entity resolution component 570 is implemented prior to the reranker 590. The entity resolution component 570 may alternatively be implemented after the reranker 590. Implementing the entity resolution component 570 after the reranker 590 limits the NLU hypotheses processed by the entity resolution component 570 to only those hypotheses that successfully pass through the reranker 590.

The reranker 590 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2A). The NLU component 260 may separately perform NLU processing described above with respect to domains associated with skills that are at least partially implemented as part of the skill system(s) 125. In an example, the shortlister component 450 may only process with respect to these latter domains. Results of these two NLU processing paths may be merged into NLU output data 585, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 585, skill result data 530, and the other data 520 in order to output ranked output data 525. The ranked output data 525 may include an n-best list where the NLU hypotheses in the NLU results data 585 are reordered such that the n-best list in the ranked output data 525 represents a prioritized list of skills to respond to a user input as determined by the post-NLU ranker 265. The ranked output data 525 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 585 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 530 based on the first NLU hypothesis and the second NLU hypothesis, respectively. For example, the post-NLU ranker 265 may send the first NLU hypothesis to the first skill 290*a* along with a request for the first skill 290*a* to at least partially execute with respect to the first NLU hypothesis. The post-NLU ranker 265 may also send the second NLU hypothesis to the second skill 290*b* along with a request for the second skill 290*b* to at least partially execute with respect to the second NLU hypothesis. The post-NLU ranker 265 receives, from the first skill 290*a*, first result data 530*a* generated from the first skill 290*a*'s execution with respect to the first NLU hypothesis. The post-NLU ranker 265 also receives, from the second skill 290*b*, second results data 530*b* generated from the second skill 290*b*'s execution with respect to the second NLU hypothesis.

The result data 530 may include various portions. For example, the result data 530 may include content (e.g., audio data, text data, and/or video data) to be output to a user. The result data 530 may also include a unique identifier used by the system(s) 120 and/or the skill system(s) 125 to locate the data to be output to a user. The result data 530 may also include an instruction. For example, if the user input corresponds to "turn on the light," the result data 530 may include an instruction causing the system to turn on a light associated with a profile of the device (110*a*/110*b*) and/or user.

The post-NLU ranker 265 may consider the first result data 530*a* and the second result data 530*b* to alter the first confidence score and the second confidence score of the first NLU hypothesis and the second NLU hypothesis, respectively. That is, the post-NLU ranker 265 may generate a third confidence score based on the first result data 530*a* and the first confidence score. The third confidence score may correspond to how likely the post-NLU ranker 265 determines the first skill will correctly respond to the user input. The post-NLU ranker 265 may also generate a fourth confidence score based on the second result data 530*b* and the second confidence score. One skilled in the art will appreciate that a first difference between the third confidence score and the fourth confidence score may be greater than a second difference between the first confidence score and the second confidence score. The post-NLU ranker 265 may also consider the other data 520 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 530 associated with the skill 290 with the highest altered confidence score to be the data output in response to the current user input. The post-NLU ranker 265 may also consider the text data 510 to alter the NLU hypotheses confidence scores.

The orchestrator component 230 may, prior to sending the NLU results data 585 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 585, including NLU hypotheses paired with skills 290, to the post-NLU ranker 265. In response to text data 510 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 585, to provide result data 530 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 530. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 530 indicating slots of a framework that the skill 290 further needs filled or entities that the skill 290 further needs resolved prior to the skill 290 being able to provided result data 530 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 530 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 530 provided by the skills 290 to alter the NLU processing confidence scores generated by the reranker 590. That is, the post-NLU ranker 265 uses the result data 530 provided by the queried skills 290 to create larger differences between the NLU processing confidence scores generated by the reranker 590. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 530 responsive to NLU hypotheses over skills 290 that provide result data 530 corresponding to an indication that further information is needed, as well as skills 290 that provide result data 530 indicating they can provide multiple responses to received NLU hypotheses. For example, the post-NLU ranker 265 may generate a first score for a first skill 290a that is greater than the first skill's NLU confidence score based on the first skill 290a providing result data 230a including a response to a NLU hypothesis. For further example, the post-NLU ranker 265 may generate a second score for a second skill 290b that is less than the second skill's NLU confidence score based on the second skill 290b providing result data 530b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 530c indicating the third skill 290c can provide multiple responses to a NLU hypothesis.

The post-NLU ranker 265 may consider other data 520 in determining scores. The other data 520 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 520 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 585, the post-NLU ranker 265 may determine whether profile data, associated with the user and/or device that originated the user input, includes indications of enabled skills.

The other data 520 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 520 may include information indicating the veracity of the result data 530 provided by a skill 290. For example, if a user says "tell me a recipe for pasta sauce," a first skill 290a may provide the post-NLU ranker 265 with first result data 530a corresponding to a first recipe associated with a five star rating and a second skill 290b may provide the post-NLU ranker 265 with second result data 530b corresponding to a second recipe associated with a one star rating. In this situation, the post-NLU ranker 265 may increase the NLU processing confidence score associated with the first skill 290a based on the first skill 290a providing the first result data 530a associated with the five star rating and/or decrease the NLU processing confidence score associated with the second skill 290b based on the second skill 290b providing the second result data 530b associated with the one star rating.

The other data 520 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 520 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oregon. A second skill 290b may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290a and/or decrease the NLU processing confidence score associated with the second skill 290b. Likewise, if the device and/or user that originated the user input is located in Boston, Massachusetts, the post-NLU ranker 265 may increase the NLU processing confidence score associated with the second skill 290b and/or decrease the NLU processing confidence score associated with the first skill 290a.

The other data 520 may include information indicating a time of day. The system may be configured with skills 290 that operate with respect to certain times of day. For example, a user may provide a user input corresponding to "order me food." A first skill 290a may generate first result data 530a corresponding to breakfast. A second skill 290b may generate second result data 530b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 520 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 520 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 520 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 520 may include information indicating how long it took a skill 290 to provide result data 530 to the post-NLU ranker 265. When the post-NLU ranker 265 multiple skills 290 for result data 530, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 520 to increase and decrease NLU processing confidence scores associated with various skills 290 that the post-NLU ranker 265 has already requested result data from. Alternatively, the post-NLU ranker 265 may use the other data 520 to determine which skills 290 to request result data from. For example, the post-NLU ranker 265 may use the other data 520 to increase and/or decrease NLU processing confidence scores associated with skills 290 associated with the NLU results data 585 output by the NLU component 260. The post-NLU ranker 265 may select n-number of top scoring altered NLU processing confidence scores. The post-NLU ranker 265 may then request result data 530 from only the skills 290 associated with the selected n-number of NLU processing confidence scores.

As described, the post-NLU ranker 265 may request result data 530 from all skills 290 associated with the NLU results data 585 output by the NLU component 260. Alternatively, the system(s) 120 may prefer result data 530 from skills implemented entirely by the system(s) 120 rather than skills at least partially implemented by the skill system(s) 125. Therefore, in the first instance, the post-NLU ranker 265 may request result data 530 from only skills associated with the NLU results data 585 and entirely implemented by the system(s) 120. The post-NLU ranker 265 may only request result data 530 from skills associated with the NLU results data 585, and at least partially implemented by the skill system(s) 125, if none of the skills, wholly implemented by the system(s) 120, provide the post-NLU ranker 265 with result data 530 indicating either data response to the NLU results data 585, an indication that the skill can execute the user input, or an indication that further information is needed.

As indicated above, the post-NLU ranker 265 may request result data 530 from multiple skills 290. If one of the skills 290 provides result data 530 indicating a response to a NLU hypothesis and the other skills provide result data 530 indicating either they cannot execute or they need further information, the post-NLU ranker 265 may select the result data 530 including the response to the NLU hypothesis as the data to be output to the user. If more than one of the skills 290 provides result data 530 indicating responses to NLU hypotheses, the post-NLU ranker 265 may consider the other data 520 to generate altered NLU processing confidence scores, and select the result data 530 of the skill associated with the greatest score as the data to be output to the user.

A system that does not implement the post-NLU ranker 265 may select the highest scored NLU hypothesis in the NLU results data 585. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 585 to provide result data 530 to the post-NLU ranker 265 prior to the post-NLU ranker 265 ultimately determining the skill 290 to be invoked to respond to the user input. Some of the skills 290 may provide result data 530 indicating responses to NLU hypotheses while other skills 290 may providing result data 530 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 530, associated with the skill 290 associated with the highest score, for output to the user. Alternatively, the post-NLU ranker 265 may output ranked output data 525 indicating skills 290 and their respective post-NLU ranker rankings. Since the post-NLU ranker 265 receives result data 530, potentially corresponding to a response to the user input, from the skills 290 prior to post-NLU ranker 265 selecting one of the skills or outputting the ranked output data 525, little to no latency occurs from the time skills provide result data 530 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 290 may provide result data 530 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 530 indicating a response to the user input, the post-NLU ranker 265 (or another component of the system(s) 120, such as the orchestrator component 230) may simply cause content corresponding to the result data 530 to be output to the user. For example, the post-NLU ranker 265 may send the result data 530 to the orchestrator component 230. The orchestrator component 230 may cause the result data 230 to be sent to the device (110a/110b), which may output audio and/or display text corresponding to the result data 230. The orchestrator component 230 may send the result data 530 to the ASR component 250 to generate output text data and/or may send the result data 530 to the TTS component 280 to generate output audio data, depending on the situation.

The skill 290 associated with the highest post-NLU ranker score may provide the post-NLU ranker 265 with result data 530 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 530 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 530 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 530, the system may further engage a transactional skill 290 after the transactional skill 290 provides the post-NLU ranker 265 with result data 530 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 6:
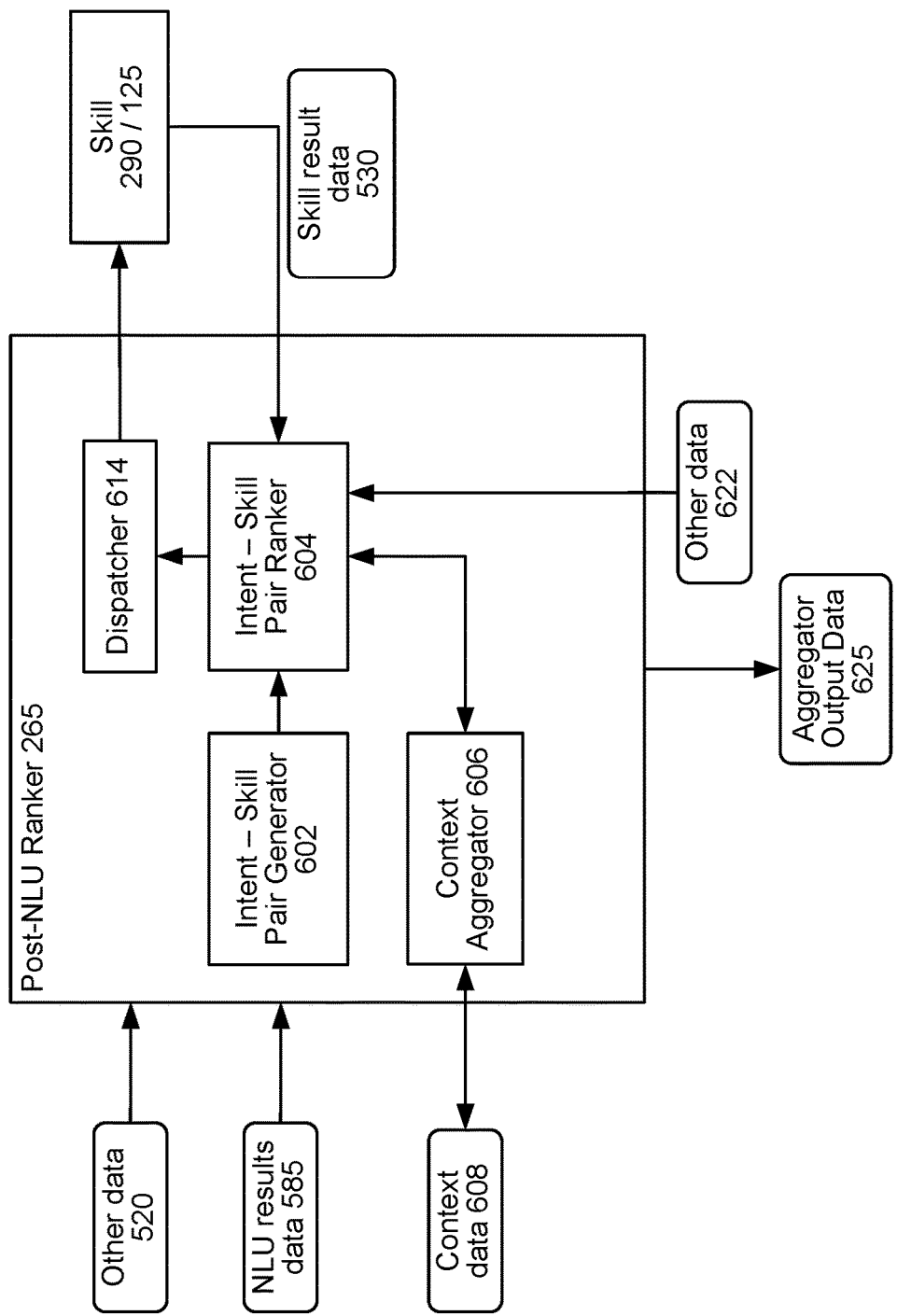
FIG. 6 is a conceptual diagram illustrating how a post-NLU ranker may process according to embodiments of the present disclosure.

FIG. 6 illustrates other configurations and operations of the post-NLU ranker 265. When the post-NLU ranker 265 receives NLU results data 585, the NLU results data 585 may be sent to an intent-skill pair generator 602. The intent-skill pair generator 602 may include information about what skills are capable of handling what intents. Such information may be context agnostic, and may thus indicate what skills are capable of handling what intents generally, without regard to the context associated with the user input. The intent-skill pair generator 602 thus receives the NLU results data 585 and identifies what particular candidate skills may handle the intent for NLU hypothesis. For example, if a NLU hypothesis includes a particular intent, the intent-skill pair generator 602 identifies each skill that may execute with respect to the intent. For further example, if the NLU results data 585 include multiple NLU hypotheses including multiple intents, the intent-skill pair generator 602 associates each different NLU hypothesis with each skill that may execute with respect to the NLU hypothesis. As illustrated, the intent-skill pair generator 602 may be implemented at part of the post-NLU ranker 265. However, one skill in the art will appreciate that the intent-skill pair generator 602 may be implemented as part of the NLU component 260 or in another component without departing from the present disclosure. In such a case, the NLU results data 585 may include intent-skill pairs.

The post-NLU ranker 265 may also include an intent-skill pair ranker 604. The intent-skill pair ranker 604 ranks the intent-skill pairs generated by the intent-skill pair generator 602 based on, for example, the number of filled slots of a NLU hypothesis, an NLU confidence score associated with a NLU hypothesis, context information output by a context aggregator 606, and/or other data.

The post-NLU ranker 265 may include the context aggregator 606. The context aggregator 606 receives context data 608 from various contextual sources. The context data 608 may include time data, which represents a time of receipt of the user input by the device 110, a time or receipt of the user input by the system(s) 120, a user identifier associated with the user input (which may, in certain embodiments, include user recognition data 395), a device identifier of the device 110, whether other devices are linked to the device 110, and/or other information. The context aggregator 606 may aggregate the context data 608 and put the context data 608 in a form that can be processed by the intent-skill pair ranker 604. Context data 608 may include data obtained from the device 110 or from other services connected to the system(s) 120.

The context data 608 may include skill availability data. Such information may indicate what skills are available and authorized to process the user input. For example, if the user has only enabled certain skills, the enabled skills may be noted in the skill availability data.

The context data 608 may also include dialog data. A "dialog" as used herein may refer to data transmissions (such as relating to multiple user inputs and system(s) 120 outputs) between the system(s) 120 and a local device (e.g., the device 110) that all relate to a single originating user input. Thus, the data transmissions of a dialog may share a dialog identifier or other unique identifier that may be used by the orchestrator component 230, skill(s) 290, skill server(s) 125, etc. to track information across the dialog. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog may or may not start with speaking of a wakeword. Each user input of a dialog may be associated with a unique user input identifier such that multiple user input identifiers may be associated with a single dialog identifier. The dialog identifier may also be used to track data across skills for the same dialog, as indicated herein.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 608 may be one portion of the data used by the intent-skill pair ranker 604 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 608 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 608 (and/or other data 622) may include a metadata flag/indicator that represents whether the particular skill being executed is one that can handle a go-back (or other navigational) request.

The context data 608 may also include user profile data. The user profile data may represent preferences and/or characteristics of the user that originated the current user input. Such data may be received from the profile storage 270.

The context data 608 may also include location data. The location data may represent a location of the device 110 from which the user input was received.

The context data 608 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 608 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 608 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 608 may also include other context data not explicitly recited herein.

The intent-skill pair ranker 604 may operate one or more trained models that are configured to process the NLU results data 585, skill result data 530, and other data 622 in order to determine a single best skill for executing the current user input from the available pairs output by the intent-skill pair generator 602. The intent-skill pair ranker 604 may send queries to the skills and request a first skill and a second skill (for example the candidate skills identified by the pair generator 602), to provide potential result data indicating whether the skill can handle the intent at the particular moment and if so, what the output data for the particular skill would be (e.g., data the skill would provide to a user if the skill were selected to execute the user input) based on the NLU results data 585. For example, the intent-skill pair ranker 604 may send a first NLU hypothesis, associated with a first skill, to the first skill along with a request for the first skill to at least partially execute with respect to the first NLU hypothesis. The intent-skill pair ranker 604 may also send a second NLU hypothesis, associated with the second skill, to the second skill along with a request for the second skill to at least partially execute with respect to the second NLU hypothesis. The intent-skill pair ranker 604 receives, from the first skill, first result data 530*a* generated from the first skill's execution with respect to the first NLU hypothesis. The intent-skill pair ranker 604 also receives, from the second skill, second results data 530*b* generated from the second skill's execution with respect to the second NLU hypothesis. Based on the first results data 530a, a first NLU confidence score associated with the first NLU hypothesis, the second results data 530b, a second NLU confidence score associated with the second NLU hypothesis, and other data 622 (e.g., context data, user profile data, etc.), the intent-skill pair ranker 604 determines the best skill for executing the current user input. The intent-skill pair ranker 604 sends an indication of the best skill to a dispatcher component 614.

The dispatcher 614 may then send the selected skill the information needed to execute the user input, including an indication of the intent, the appropriate context data 608 (such as device identifier, user identifier, or the like), slot data, utterance identifier, dialog identifier, or any other information needed.

One or more models implemented by components of the orchestrator component 230, post-NLU ranker 265, shortlister 450, or other component may be trained and operated according to various machine learning techniques.

FIG. 7 is a conceptual diagram illustrating how a system may process a request resulting in execution of multiple skills, such as when one skill invokes another, according to embodiments of the present disclosure. Prior to runtime a skill 290x may register as a consumer for an action using a registration component 702. Another skill 290y may register as a provider for the action using the registration component 702. The skills 290x, 290y may be examples of a skill 290 described herein including potentially first skill 290a, second skill 290b, etc.

A skill 290x may generate a request to invoke an action (e.g., a second action) requiring the use of another skill. The request may be generated based on a user input (such as a confirmation to a prompt) indicating that the user wants the second action to be performed. The request may be generated after the skill 290x has performed (or has received a request to perform) a first action using data determined from a user input and other components of the system(s) 120. The request may include some or all of the data (e.g., first payload data) used by the skill 290x to perform the first action. Alternatively, or in addition, the request may include some second payload data (that may include some information in the first payload data) that is determined to be needed or useful for performing the second action.

The system(s) 120 may include a request router component 730 that may route the request from a first skill 290x to a links dispatcher component 740. The links dispatcher component 740 may facilitate linking skills to actions executable by other skills and may route requests from skills to the links action manager 295 for processing and validation, and may also route requests to the appropriate skills that are registered as providers for an action. The links dispatcher component 740 may be implemented within the orchestrator 230 or in some other manner.

The links action manager 295 may maintain an action template data storage 705 for all skills that are registered to use an action and a skill-action data storage 716 for storing payload data and information on linking skills and actions. The links action manager 295 may include various components such as an access control component 710, a payload validation component 715 and a skill retriever 720. The access control component 710 may determine if a skill 290x is registered as a consumer of the action included in the request from the skill 290x. The payload validation component 715 may determine if the payload data included in the request is valid for the requested action. The skill retriever component 720 may determine all the skills that are registered as providers for the action.

Payload data may include data required by the second skill 290y to perform an action. For example, for a skill 290y to perform the action of reserving a car, the payload data may include the following: number of passengers, pickup time, and pickup location. In another example, for a skill 290y to perform the action of print document, the payload data may include the following: document/file location, printer identifier, and number of pages. In another example, for a skill 290y to perform the action of creating a shopping list, the payload data may include the following: item name and amount. The skill-action data storage 716 stores data indicating which skills are allowed to invoke which actions, which skills are allowed to perform which actions, and what payload data is needed to execute which actions. The payload validation component 715 may determine if the payload data is valid by determining if the payload data provided by skill 290x includes the required data as specified in the skill-action data storage 716 to perform the particular action. The payload validation component 715 may transmit validation result data 716 to the links dispatcher 740. The validation result data 716 may indicate if the payload data is valid or invalid.

The system(s) 120 may also include a skill selector component 750 to determine the best skill to perform the action. Once the request and payload data is validated, the links dispatcher component 740 may send the request and payload data to a fact provider component 755 of the skill selector component 750. The fact provider component 755 may receive, from the skill retriever component 720, a list of all skills registered as providers for the action. The list of skills may be filtered by a filter component 760 based on the request and payload data. The filtered list may be further ranked by a ranker component 765 using various ranking techniques and factors. The ranker 765 may be the post-NLU ranker 265 or another ranking component. An arbiter component 780 may select the final skill (e.g., skill 290y) from the ranked list to perform the action. The operations performed by ranker 765 and/or arbiter 780 may be similar to the operations performed by post-NLU ranker 265 as discussed above in reference to FIG. 6. The links dispatcher component 740 may send the request and the payload data to a skill 290y selected by the skill selector component 750.

Figure 8:
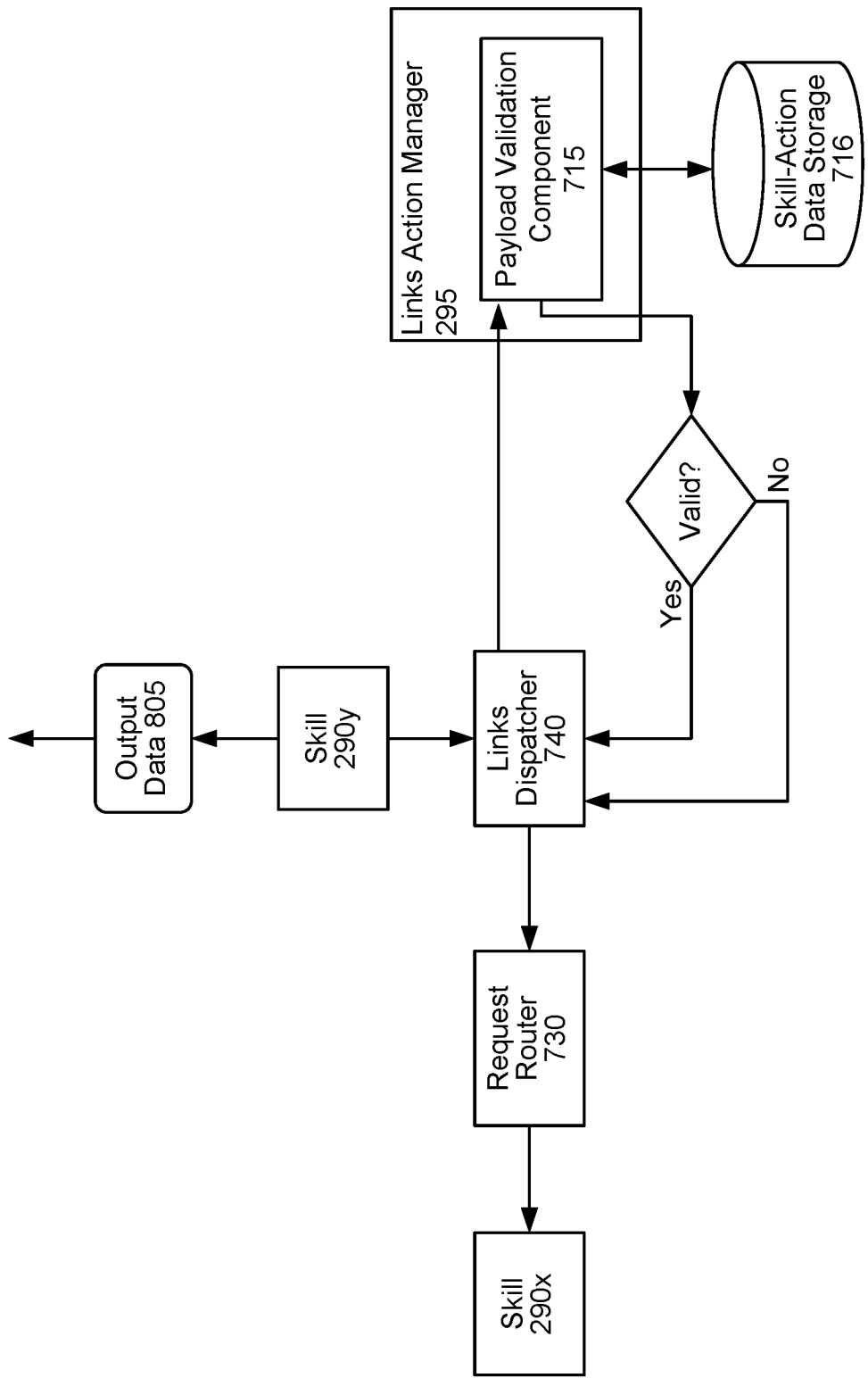
FIG. 8 is a conceptual diagram illustrating how a system may further process a request resulting in execution of multiple skills according to embodiments of the present disclosure.

FIG. 8 is a conceptual diagram illustrating how a system may allowing a certain skill to be invoked by another skill according to embodiments of the present disclosure. The second skill 290y may perform the second action (e.g., the action based on the request initiated by the first skill) and the payload data received from the links dispatcher component 740, and may generate output data 805 based on completion or performance of the action. The skill 290y may generate and send a message including a status code and/or other data (return payload data) to the links dispatcher component 740. The links dispatcher component 740 may send the message to the links action manager component 295 to validate the status code and/or return payload data, and send the validation results to the links dispatcher component 740. The links dispatcher component 740 returns the validation results to the request router 730, which then forwards it to the skill 290x that requested the action.

FIG. 9 is a signal flow diagram illustrating how a skill may register for an action according to embodiments of the present disclosure. A skill 290x may send (902) data to the registration component 702 to register for an action. For explanation purposes, it is assumed that skill 290x registers as a consumer of the action. The registration component 702 may send (904) the data from the skill 290x to the links action manager 295, and the action template storage 705 may store (906) the data associating skill 290x with the action.

A skill 290y may send (908) data to the registration component 702 to register for an action. For explanation purposes, it is assumed that skill 290y registers as a provider of the action. The registration component 702 may send (910) the data from the skill 290x to the links action manager 295, and the action template storage 705 may store (912) the data associating skill 290y with the action.

In some embodiments, the skill 290y, registering as a provider of an action, may also send (908) information to the registration component 702 that indicates which data the skill 290y requires to perform the action and which data is optional/acceptable. For example, if skill 290y is registering as a provider for action "OrderCar," the skill 290y may specify at step 908 that it requires the following information to perform the action: number of passengers, time, and pickup location.

In some embodiments, the action template storage 705 may store a template for requesting an action based on the information indicated as required by a skill (e.g., skill 290y) registering as a provider for the action. The template may include or specify a naming convention for calling the particular action. The template may also include or specify one or more data fields that are required and/or one or more data fields that may be optional to call the particular action. The template may also include or specify one or more return values for the data fields and/or for executing/completing the action.

FIGS. 10A-10D are data flow diagrams illustrating how a request requiring execution of multiple skills is processed according to embodiments of the present disclosure. The data flow illustrated in FIGS. 10A-10D may occur after one or more skills have registered for an action as described in connection with FIG. 9.

The process begins when a skill 290x may send (1002) a request to invoke/perform an action to the request router component 730. The skill 290x may determine the action to be performed based on a user input. For example, a device 110 may receive an utterance from a user 5. The system(s) 120 may process audio data 211 corresponding to the utterance using ASR and NLU processing described above to determine an intent, slot data, and other information from the audio data 211. The skill 290x may determine that it is authorized or capable of requesting performance of an action by another skill. In an example embodiment, the skill 290x may generate output data for the device 110 to output (as device generated speech or display text). The output data may ask the user 5 whether he or she wants the device 110/system(s) 120 to perform the action. If the user 5 confirms (via an utterance or other input), then the skill 290x generates a request to perform the action. The request may include the intent, the slot data and other information determined from the user's initial utterance/input.

The request router component 730 may determine (1004) payload data based on the request and the action. The request router component 730 may generate payload data required to perform the action. For example, if the action is "OrderCar," the payload data may include number of passengers, pickup time, and pickup location. The payload data may be determined from the intent, the slot data and other information from the initial utterance/input.

The request router component 730 may send (1006) the payload data to the links dispatcher 740. The links dispatcher 740 may send (1008) the payload data to the links action manager 295. The links action manager 295 may determine (1009) if skill 290x is authorized or registered to request the action. The links action manager 295 may query or check a database that stores information on registered skills (e.g., action template storage 705). If the skill 290x is not authorized or registered, then the links action manager 295 sends an error or invalid message to the links dispatcher 740. If the skill 290x is authorized or registered, then the links action manager 295 may determine (1010) if the payload data is valid for the requested action. For example, certain actions may require particular data or information to be performed. At step 1010, the links action manager 295 may determine if the payload data received from the skill 290x is valid by querying or checking a data source storing information on data required by actions (e.g., skill-action data storage 716). The links action manager 295 may also determine if the payload is valid by determining if skill 290x is authorized to send the payload data to other components of the system. The links action manager 295 may send the results of the validation (1010) to the links dispatcher 740.

In an example embodiment, the system may generate output data or a prompt to confirm with the user before executing the action invoked by skill 290x. The output data or prompt may be, via the device 110, outputted in text form or audio form using TTS processing to request confirmation from the user to proceed with the action. For example, the when the request from skill 290x to reserve a car is received by the links dispatcher 740 or the links action manager 295, the system may ask the user "would you like to order a car?" prior to processing the request and payload data from the skill 290x. If the user responds "yes" or confirms to proceed with the action of reserving a car, then the system may continue with steps 1009 and/or 1010.

Figure 10A:
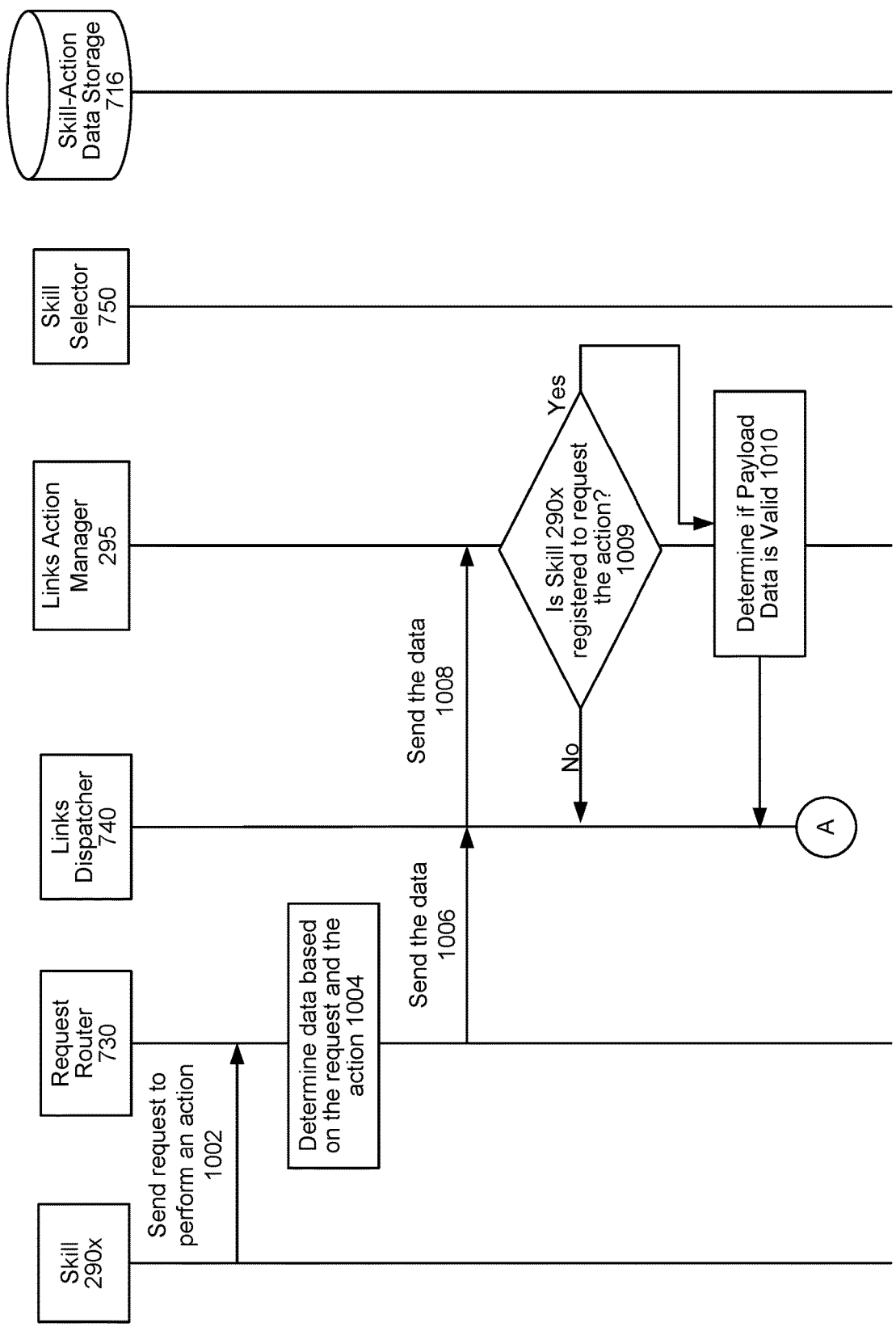
Figure 10B:
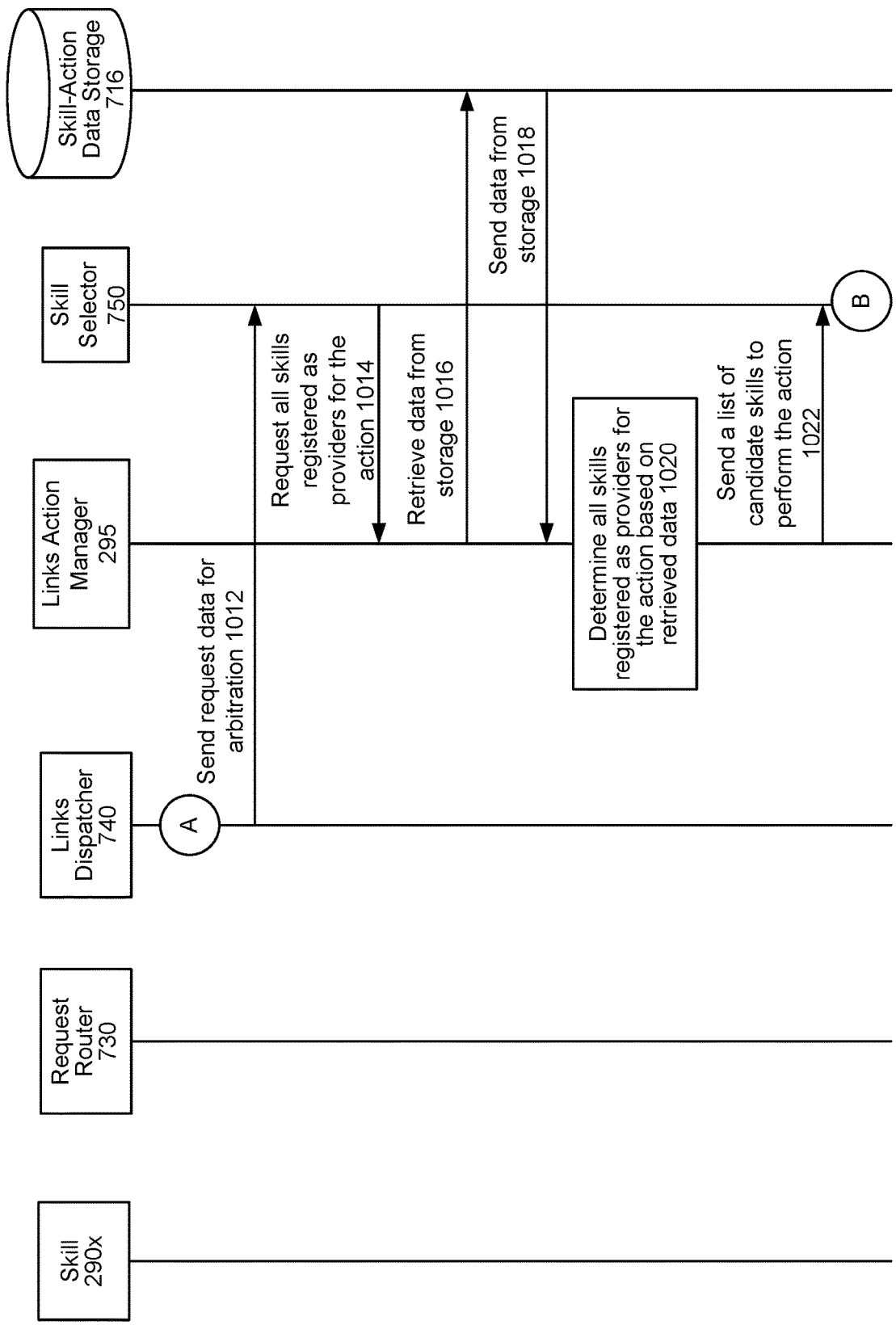

The data flow continues on FIG. 10B. The links dispatcher 740 may send (1012) the request and the payload data for arbitration to the skill selector 750. The skill selector 750 may send (1014) a request to the links action manager 295 for all skills registered as providers for the action. The links action manager 295 may query (1016) data from the skill-action data storage 716 indicating all the skills registered as providers for the action. The skill-action data storage 716 may send (1018) the data to the links action manager 295. The links action manager 295 may determine (1020) all the skills registered as providers for the action based on the data retrieved from the skill-action data storage 716 and generate a list of candidate skills to perform the action. The links action manager 295 may send (1022) the list of candidate skills to the skill selector 750.

The data flow continues on FIG. 10C. The skill selector 750 may filter (1024) the list of candidate skills based on the payload data. For explanation purposes continuing with the example of performing the action "OrderCar," a skill on the list of candidate skills may be unable to reserve a car more than 24 hours in advance of the pickup time, where the pickup time is indicated in the payload data. As another example, a skill on the list of candidate skills may not service the particular pickup location. The skill selector 750 may remove that skill from the list of candidate skills. The skill selector 750 may rank (1026) the filtered list of candidates, and may determine (1028) one skill from the ranked list of candidates to perform the action. The skill selector 750 may use various techniques to rank the skills. The skills may be ranked based on the user preferences or user profile data associated with user 5. For example, the user profile data may indicate that the user 5 has linked the device 110 to a particular skill account and/or prefers to use a particular skill to complete the action. As another example, a particular skill may be generally popular with users of the system to perform the action. The skill selection 750 may rank such skills higher than the other skills on the list of candidates. The skill selector 750 may send (1030) information indicating the selected skill to the links dispatcher 740. In some embodiments, the skill selector 750 may also filter and rank the list of candidate skills based on user profile data to ensure that the action is not performed by a skill that the user is not authorized to use, or that the user does not have access to or an account for, etc. The links dispatcher 740 sends the payload data and a request to perform the action to the selected skill, for example, skill 290$y$.

Figure 10D:
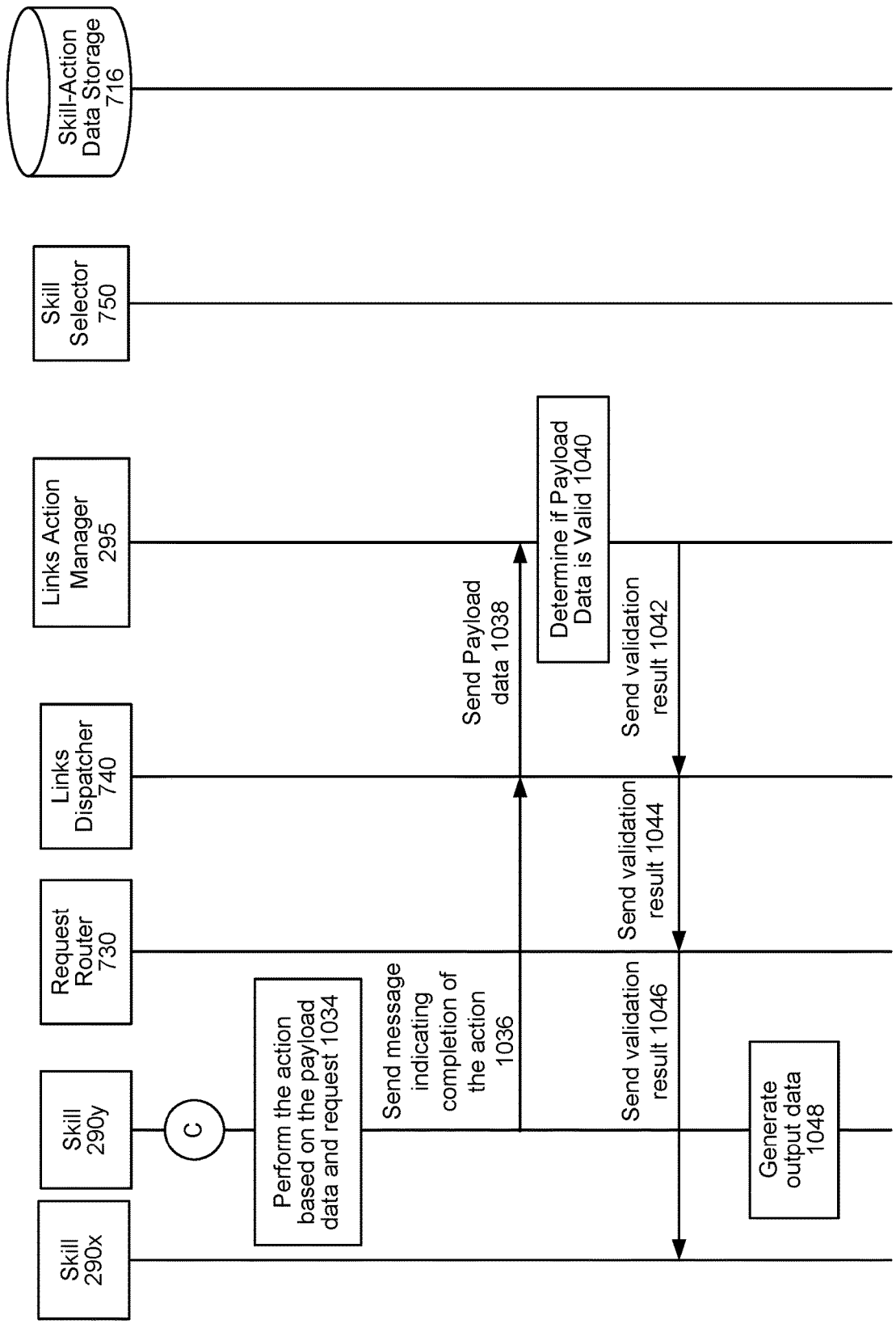

The data flow continues on FIG. 10D. The skill 290$y$ may perform (1034) the action using the payload data. The skill 290$y$ may send (1036) a message and return payload data to the links dispatcher 740 indicating completing of the action. The links dispatcher XFF40 may send (1038) the return payload data to the links action manager 295. The links action manager 295 may determine (1040) if the return payload data is valid. The links action manager 295 may determine if the return payload is valid by querying the skill-action data storage 716. The links action manager 295 may send (1042) the validation results to the links dispatcher 740, and the links dispatcher 740 may send (1044) the validation results to the request router 730. The request router 730 may send (1046) the validation results to the skill 290$x$. The skill 290$y$ may generate (1048) output data based on performing the action. The output data may include data indicating completion of the action or the results of completing the action, for example, car reservation data. The output data may include text confirming the performance of the action (e.g., car reservation) that may be converted to audio output using TTS processing.

FIG. 11 is a block diagram conceptually illustrating a device 110 that may be used with the system. FIG. 12 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1102/1202).

Computer instructions for operating each device (110/120/225) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/225) includes input/output device interfaces (1102/1202). A variety of components may be connected through the input/output device interfaces (1102/1202), as will be discussed further below. Additionally, each device (110/120/225) may include an address/data bus (1124/1224) for conveying data among components of the respective device. Each component within a device (110/120/225) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1102/1202), processor(s) (1104/1204), memory (1106/1206), and/or storage (1108/1208) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 13:
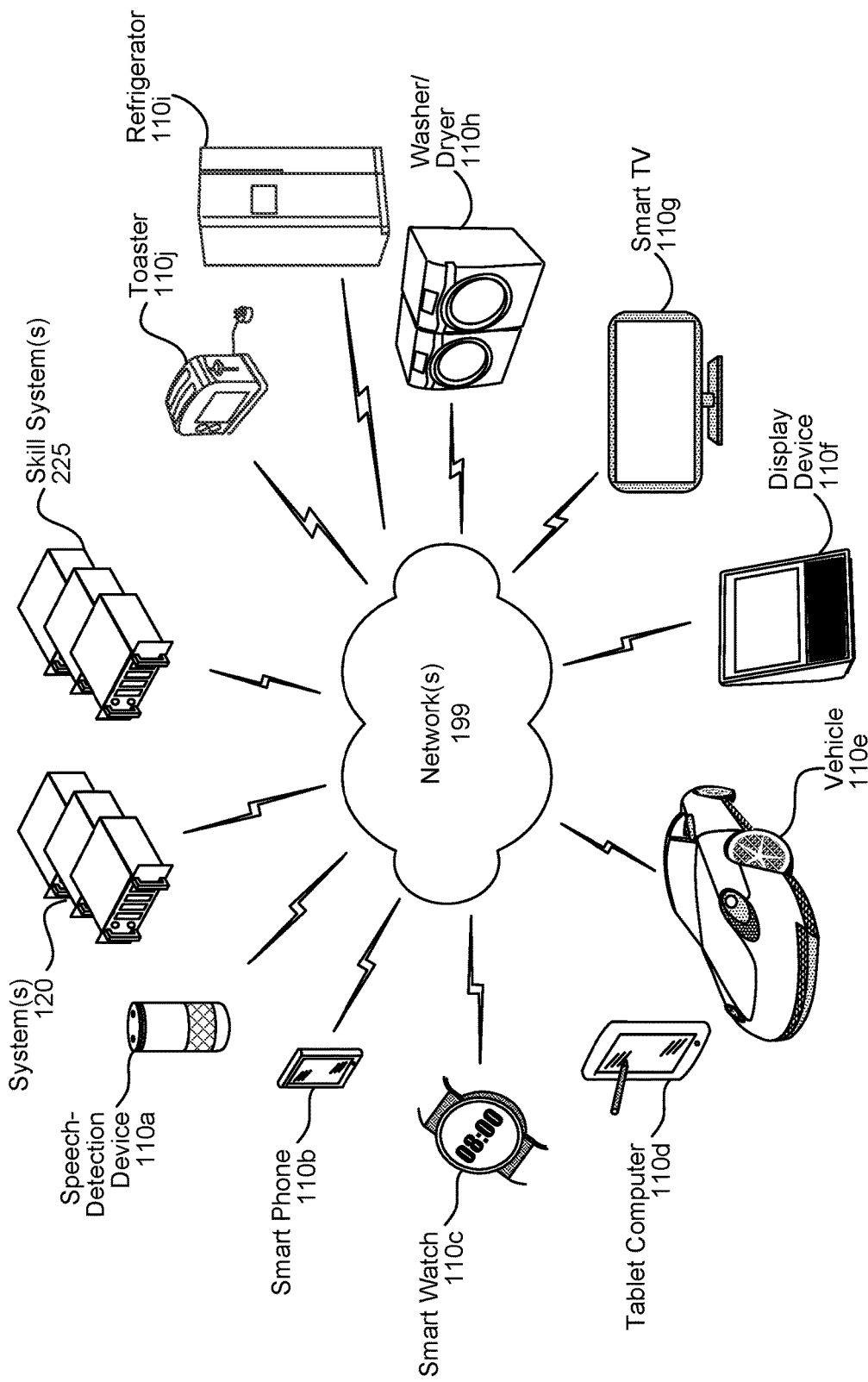
FIG. 13 illustrates an example of a computer network for use with the speech processing system.

As illustrated in FIG. 13, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving first data indicating a first component, capable of performing a first action in response to a natural language input, is authorized to request performance of a second action that is performable by at least one other component different than the first component;
after receiving the first data, receiving input data representing a first natural language input;
determining, using the input data, that the first action is to be performed using the first component;
sending, to the first component, a first request to perform the first action in response to the first natural language input;
receiving, from the first component and after sending the first request, a second request for a second component to perform the second action, the second action being determined by the first component;

determining, using the first data, that the first component is authorized to request performance of the second action;

sending, to the second component, a third request to perform the second action; and determining, based at least in part on performance of the first action and the second action, output data responsive to the first natural language input, the output data comprising a first natural language output.

2. The computer-implemented method of claim 1, wherein determining the output data comprising the first natural language output is performed by the first component.

3. The computer-implemented method of claim 1, further comprising:

determining a user profile associated with the input data; and determining, based at least in part on the user profile, that the second component is permitted to execute with respect to the input data.

4. The computer-implemented method of claim 1, further comprising:

detecting, by a first device, a user input corresponding to the input data;

executing, by the first device, the first component; and executing, by the first device, the second component.

5. The computer-implemented method of claim 1, further comprising:

receiving a user input corresponding to an indication for the first component to be permitted to request performance of the second action; and based at least in part on the user input, determining the first data.

6. The computer-implemented method of claim 1, further comprising:

after receiving the input data and prior to sending the third request, determining that second data is required to perform the second action by the second component; and generating output data requesting the second data from a user device.

7. The computer-implemented method of claim 1, wherein the second request comprises an application program interface (API) call.

8. The computer-implemented method of claim 1, further comprising:

determining, by the first component, second data corresponding to execution of the second action; and sending, from the first component to the second component, the second data.

9. The computer-implemented method of claim 8, wherein the second data comprises natural language data.

10. The computer-implemented method of claim 1, further comprising:

determining, by the first component, second data corresponding to execution of the second action by the second component; and causing a user device to display an output corresponding to the second data.

11. A system comprising:

at least one processor; and at least one memory comprising instructions that, when executed by the at least one processor, cause the system to:

receive first data indicating a first component, capable of performing a first action in response to a natural language input, is authorized to request performance of a second action that is performable by at least one other component different than the first component;

after receipt of the first data, receiving input data representing a first natural language input;

determine, using the input data, that the first action is to be performed using the first component;

send, to the first component, a first request to perform the first action in response to the first natural language input;

receive, from the first component and after sending the first request, a second request for a second component to perform the second action, the second action being determined by the first component;

determine, using the first data, that the first component is authorized to request performance of the second action;

send, to the second component, a third request to perform the second action; and determine, based at least in part on performance of the first action and the second action, output data responsive to the first natural language input, the output data comprising a first natural language output.

12. The system of claim 11, wherein determination of the output data comprising the first natural language output is performed by the first component.

13. The system of claim 11, wherein the at least one memory further comprises instructions that, when executed by the at least one processor, further cause the system to:

determine a user profile associated with the input data; and determine, based at least in part on the user profile, that the second component is permitted to execute with respect to the input data.

14. The system of claim 11, wherein the at least one memory further comprises instructions that, when executed by the at least one processor, further cause the system to:

detect, by a first device, a user input corresponding to the input data;

execute, by the first device, the first component; and execute, by the first device, the second component.

15. The system of claim 11, wherein the at least one memory further comprises instructions that, when executed by the at least one processor, further cause the system to:

receive a user input corresponding to an indication for the first component to be permitted to request performance of the second action; and based at least in part on the user input, determine the first data.

16. The system of claim 11, wherein the at least one memory further comprises instructions that, when executed by the at least one processor, further cause the system to:

after receipt of the input data and prior to sending the third request, determine that second data is required to perform the second action by the second component; and generate output data requesting the second data from a user device.

17. The system of claim 11, wherein the second request comprises an application program interface (API) call.

18. The system of claim 11, wherein the at least one memory further comprises instructions that, when executed by the at least one processor, further cause the system to:

determining, by the first component, second data corresponding to execution of the second action; and sending, from the first component to the second component, the second data.

19. The system of claim 18, wherein the second data comprises natural language data.

20. The system of claim 11, wherein the at least one memory further comprises instructions that, when executed by the at least one processor, further cause the system to:
- determine, by the first component, second data corresponding to execution of the second action by the second component; and
- cause a user device to display an output corresponding to the second data.

* * * * *